US012651552B2

(12) United States Patent
Harayama

(10) Patent No.: US 12,651,552 B2
(45) Date of Patent: Jun. 9, 2026

(54) DISPLAY DRIVER OUTPUTTING MULTIPLE PIXEL DRIVE SIGNALS WITHOUT CAUSING DISPLAY UNEVENNESS

(71) Applicant: ROHM Co., Ltd., Kyoto (JP)

(72) Inventor: Kunihiro Harayama, Yokohama (JP)

(73) Assignee: ROHM Co., Ltd., Kyoto (JP)

( * ) Notice: Subject to any disclaimer, the term of this patent is extended or adjusted under 35 U.S.C. 154(b) by 0 days.

(21) Appl. No.: 19/047,625

(22) Filed: Feb. 7, 2025

(65) Prior Publication Data

US 2025/0259589 A1 Aug. 14, 2025

(30) Foreign Application Priority Data

Feb. 14, 2024 (JP) ................................ 2024-020203

(51) Int. Cl.
*G09G 3/20* (2006.01)

(52) U.S. Cl.
CPC ....... *G09G 3/2092* (2013.01); *G09G 2310/08* (2013.01)

(58) Field of Classification Search
CPC ...... G09G 3/36; G09G 3/3611; G09G 3/3614; G09G 3/3622; G09G 3/3625; G09G 3/364; G09G 3/3644; G09G 3/3648; G09G 3/3659; G09G 3/3666; G09G 3/3674; G09G 3/3677; G09G 3/3681; G09G 3/3685; G09G 3/3688; G09G 3/3692; G09G 3/3696
USPC .................................................. 345/87–104
See application file for complete search history.

(56) References Cited

U.S. PATENT DOCUMENTS

| | | | | |
|---|---|---|---|---|
| 11,676,527 B2 * | 6/2023 | Higuchi | G09G 3/2092 345/55 |
| 2015/0221276 A1 * | 8/2015 | Ishii | G09G 3/3685 345/98 |
| 2017/0011703 A1 * | 1/2017 | Higuchi | G09G 3/3674 |
| 2021/0183328 A1 * | 6/2021 | Taniguchi | G09G 3/3266 |
| 2022/0068188 A1 * | 3/2022 | Higuchi | G09G 3/2092 |

FOREIGN PATENT DOCUMENTS

| | | |
|---|---|---|
| JP | 2022040752 | 3/2022 |

* cited by examiner

*Primary Examiner* — Ke Xiao
*Assistant Examiner* — Nelson Lam
(74) *Attorney, Agent, or Firm* — JCIPRNET

(57) ABSTRACT

A delay control circuit generates output timing signals that cause pixel drive signals to be output at timings after elapse of different delay times. The delay control circuit includes: first to sth delay timing signal generation circuits, generating first to kth delay timing signals that bring about output timings increasing in delay time; a control signal generation circuit, supplying a start pulse signal that initiates generation of the first to kth delay timing signals to the first to sth delay timing signal generation circuits; and a delay signal selection circuit, for each output channel with respect to first to sth delay timing signal groups each including the first to kth delay timing signals, selecting from among s delay timing signals the delay timing signal that brings about an earliest output timing, and setting the delay timing signals as the first to kth output timing signals.

6 Claims, 17 Drawing Sheets

DISPLAY DRIVER OUTPUTTING MULTIPLE PIXEL DRIVE SIGNALS WITHOUT CAUSING DISPLAY UNEVENNESS

CROSS-REFERENCE TO RELATED APPLICATION

This application claims the priority benefit of Japan application serial no. 2024-020203, filed on Feb. 14, 2024. The entirety of the above-mentioned patent application is hereby incorporated by reference herein and made a part of this specification.

BACKGROUND

Technical Field

The disclosure relates to a display driver that drives a display panel in response to a video signal, and a display device including the display panel and the display driver.

Related Art

A display panel such as a liquid crystal display panel, which displays an image based on a video signal, includes multiple gate lines extending in a horizontal direction of a two-dimensional screen and multiple source lines extending in a vertical direction that are arranged to intersect each other. Furthermore, a display cell carrying a pixel is formed at an intersection of each gate line and source line. The display panel is connected to a source driver and a gate driver, in which the source driver applies a drive voltage having a voltage value corresponding to a luminance level of each pixel indicated by the input video signal to each source line, and the gate driver applies to each gate line a gate signal selecting the gate line.

To accommodate a recent trend toward large-size and high-definition display panels, a display device has been proposed in which a source driver is constructed by being divided into multiple IC chips, source driver groups obtained by division are arranged on one end side of each source line of the display panel, and each gate driver is arranged on one end side and the other end side of each gate line (for example, refer to Japanese Patent Laid-Open No. 2022-40752).

Here, when the number of source lines increases with an increased definition of the display panel, the amount of current simultaneously flowing into a group of source lines accompanying the application of the drive voltage increases in proportion to the increased number of source lines. On this occasion, a problem arises that noise is generated due to the simultaneous steep increase in the amount of current.

Since the gate line is increased in line length due to the increase in size of the display panel, the gate signal has a blunted waveform due to wiring resistance associated with the line length. The degree of this waveform blunting varies depending on the position of the display cell within the screen of the display panel. That is, compared to those reaching the display cell formed at both left and right ends of the screen, the gate signal reaching the display cell formed in a central portion of the screen exhibits a larger degree of waveform blunting. Accordingly, a delay time from when the gate signal is output from the gate driver until the gate signal reaches the display cell is longer in the central portion of the screen compared to that at the ends of the screen.

Accordingly, in the source driver of the related art, in order to suppress a timing deviation between the drive voltage output from the source driver and the gate signal output from the gate driver, an output timing of the drive voltage applied to the source line formed in the central portion of the screen is delayed from that at both left and right ends of the screen. That is, in the related art, in accordance with delay characteristics that the delay time increases from both ends of the screen toward the central portion of the screen, the output timing is controlled so that the drive voltage is applied to each source line.

In order to accurately match the timing between the gate signal output from the gate driver and the drive voltage output from the source driver regardless of the position of the display cell within the screen, it is desired that the aforementioned delay characteristics define a quadratic curve, that is, an increase rate of the delay time decreases from both left and right ends of the screen toward the central portion of the screen.

However, in the source driver of the related art, it is difficult to obtain an output timing in accordance with such delay characteristics that define a quadratic curve.

In the source driver of the related art, in the case where the source driver is divided into multiple drivers each including an independent IC chip, it is difficult to match the output timing of the drive voltage at a boundary between adjacent drivers, that is, to match the output timing of the drive voltage at an end point of one driver with the output timing of the drive voltage at a start point of the other driver. Accordingly, at the boundary between adjacent drivers, there are cases where the output timings of the drive voltages output from both drivers may significantly deviate, and display unevenness may be caused.

SUMMARY

A display driver according to the disclosure include: first to kth (where k is an integer of 2 or greater) output channels, outputting first to kth pixel drive signals corresponding to each pixel indicated by a video signal; a delay control circuit, sequentially supplying first to kth output timing signals corresponding to the first to kth output channels, the first to kth output timing signals causing the first to kth pixel drive signals to be respectively output at timings after elapse of different delay times; and an output part, outputting the first to kth pixel drive signals at an output timing corresponding to a supply timing of the first to kth output timing signals. The delay control circuit includes: first to sth delay timing signal generation circuits, generating first to sth (where s is an integer of 2 or greater) delay timing signal groups, each including first to kth delay timing signals corresponding to the first to kth output channels and bringing about output timings that increase in delay time for each output channel from the first output channel to the kth output channel or from the kth output channel to the first output channel, and being mutually different in interval between the output timings brought about by the first to kth delay timing signals; a control signal generation circuit, individually supplying, to each of the first to sth delay timing signal generation circuits, a start pulse signal indicating a timing of starting sequential generation of the first to kth delay timing signals; and a delay signal selection circuit, receiving the first to sth delay timing signal groups generated by the first to sth delay timing signal generation circuits, selecting, for each of the first to kth output channels, a delay timing signal with an earliest output timing from among s delay timing signals corresponding to that output channel, and supplying, as the first to kth output timing signals, k delay timing signals selected for each of the first to kth output channels to the output part.

A display driver according to the disclosure include: first to wth (where w is an integer of 2 or greater) drivers. Each of the first to wth drivers includes: first to kth (where k is an integer of 2 or greater) output channels, outputting first to kth pixel drive signals corresponding to each pixel indicated by a video signal; a delay control circuit, sequentially supplying first to kth output timing signals corresponding to the first to kth output channels, the first to kth output timing signals causing the first to kth pixel drive signals to be respectively output at timings after elapse of different delay times; and an output part, outputting the first to kth pixel drive signals at an output timing corresponding to a supply timing of the first to kth output timing signals. The delay control circuit includes: first to sth (where s is an integer of 2 or greater) delay timing signal generation circuits, generating first to sth delay timing signal groups, each including first to kth delay timing signals corresponding to the first to kth output channels and bringing about output timings that increase in delay time for each output channel from the first output channel to the kth output channel or from the kth output channel to the first output channel, and being mutually different in interval between the output timings brought about by the first to kth delay timing signals; a control signal generation circuit, individually supplying, to each of the first to sth delay timing signal generation circuits, a start pulse signal indicating a timing of starting sequential generation of the first to kth delay timing signals; and a delay signal selection circuit, receiving the first to sth delay timing signal groups generated by the first to sth delay timing signal generation circuits, selecting, for each of the first to kth output channels, a delay timing signal with an earliest output timing from among s delay timing signals corresponding to that output channel, and supplying, as the first to kth output timing signals, k delay timing signals selected for each of the first to kth output channels to the output part.

A display device according to the disclosure includes: a display panel, including a plurality of data lines and a plurality of gate lines arranged intersecting the plurality of data lines; and first to wth (where w is an integer of 2 or greater) drivers. Each of the first to wth drivers includes: first to kth output channels, outputting, to each of the data lines of the display panel, first to kth (where k is an integer of 2 or greater) pixel drive signals corresponding to each pixel indicated by a video signal; a delay control circuit, sequentially supplying first to kth output timing signals corresponding to the first to kth output channels, the first to kth output timing signals causing the first to kth pixel drive signals to be respectively output at timings after elapse of different delay times; and an output part, outputting the first to kth pixel drive signals at an output timing corresponding to a supply timing of the first to kth output timing signals. The delay control circuit includes: first to sth delay timing signal generation circuits, generating first to sth (where s is an integer of 2 or greater) delay timing signal groups, each including first to kth delay timing signals corresponding to the first to kth output channels and bringing about output timings that increase in delay time for each output channel from the first output channel to the kth output channel or from the kth output channel to the first output channel, and being mutually different in interval between the output timings brought about by the first to kth delay timing signals; a control signal generation circuit, individually supplying, to each of the first to sth delay timing signal generation circuits, a start pulse signal indicating a timing of starting sequential generation of the first to kth delay timing signals; and a delay signal selection circuit, receiving the first to sth delay timing signal groups generated by the first to sth delay timing signal generation circuits, selecting, for each of the first to kth output channels, a delay timing signal with an earliest output timing from among s delay timing signals corresponding to that output channel, and supplying, as the first to kth output timing signals, k delay timing signals selected for each of the first to kth output channels to the output part.

DESCRIPTION OF THE EMBODIMENTS

The disclosure provides a display driver and a display device, in which it is possible to output multiple pixel drive signals to a display panel at an output timing in accordance with delay characteristics defining a quadratic curve in which an increase rate of a delay time decreases from an end toward a central portion of a screen, without causing display unevenness.

In the display driver according to the disclosure, the first to kth output timing signals that cause the first to kth pixel drive signals to be respectively output at timings after elapse of different delay times are generated as follows. That is, first, s sets (where s is an integer of 2 or greater) of delay timing signal groups including first to kth delay timing signals indicating output timings that increase in delay time from the first (kth) output channel toward the kth (first) output channel are generated. Then, with respect to the first to sth delay timing signal groups each including the first to kth delay timing signals, a delay timing signal with the earliest output timing is selected from among s delay timing signals for each of the first to kth output channels, and the selected k delay timing signals are used as the first to kth output timing signals.

On this occasion, by changing an increase rate of the delay time according to the first to kth delay timing signals and changing the timing of starting the generation of the first to kth delay timing signals in each of s delay timing signal groups, it is possible to obtain the first to kth output timing signals having delay characteristics defining a quadratic curve. According to such a configuration, by determining a desired delay time as the delay time at an end point (kth) output channel by the first to kth output timing signals, it is possible to calculate the delay time at a start point (first) output channel of this display driver from the desired delay time. Accordingly, when outputting each pixel drive signal at an output timing in accordance with delay characteristics defining a quadratic curve to each of multiple data lines of a display panel by multiple drivers, it is possible to easily match the output timings of the pixel drive signals at a boundary between adjacent drivers.

Accordingly, according to the disclosure, it is possible to output multiple pixel drive signals to a display panel at an output timing in accordance with delay characteristics defining a quadratic curve where an increase rate of delay time decreases from an end toward a central portion of a screen, without causing display unevenness due to a deviation in output timing at a boundary between drivers.

Embodiment 1

Embodiments of the disclosure will be described in detail below with reference to the drawings.

Figure 1:
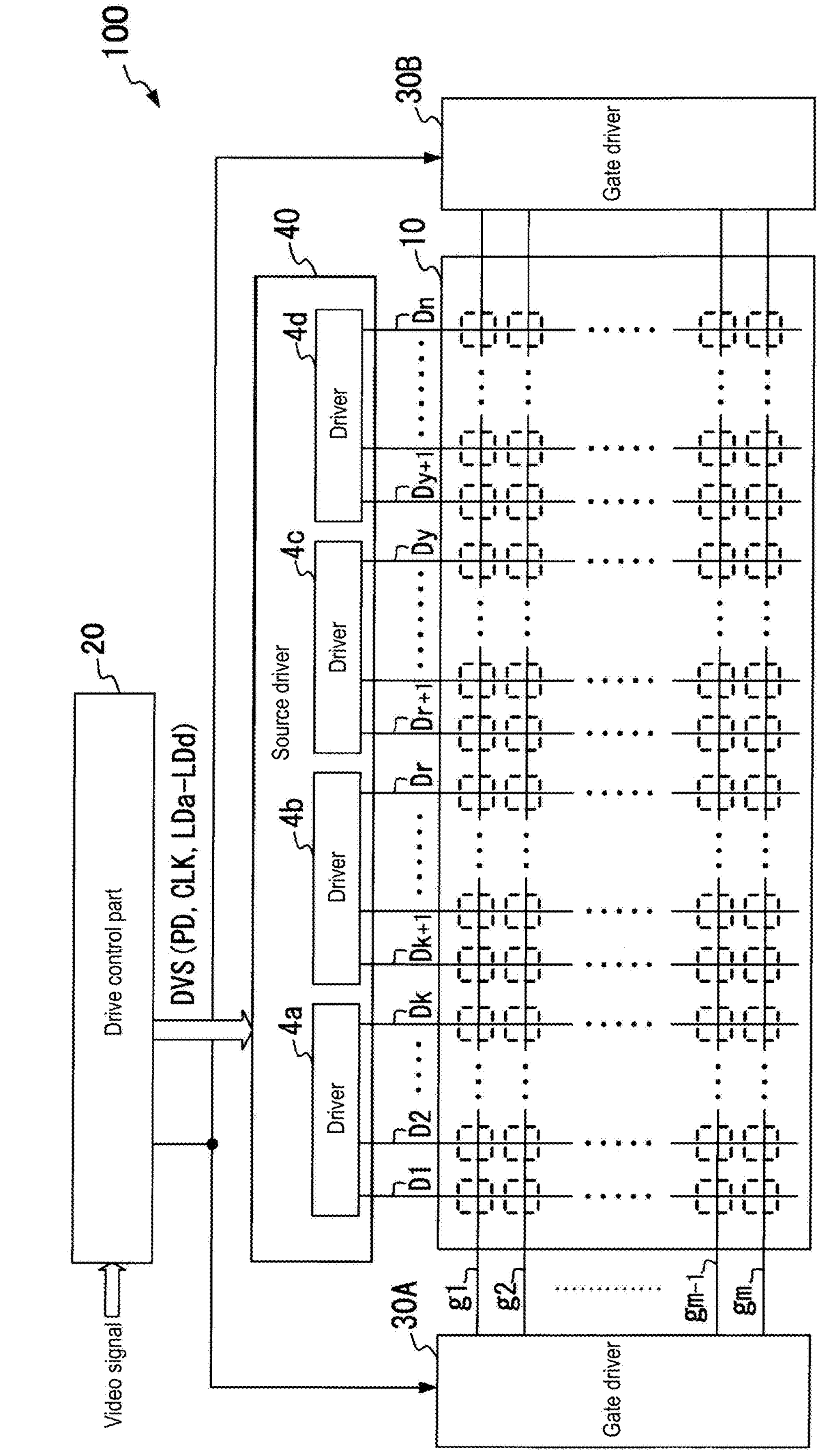
FIG. 1 is a block diagram showing a schematic configuration of a display device 100 including a display driver according to a first example of the disclosure.

FIG. 1 is a diagram showing a schematic configuration of a display device 100 including a display driver according to the disclosure.

As shown in FIG. 1, the display device 100 includes a drive control part 20, gate drivers 30A and 30B, a source driver 40, and a display panel 10. The source driver 40 is composed of multiple semiconductor integrated circuit (IC) chips each having the same configuration. For example, in the embodiment shown in FIG. 1, the source driver 40 is configured in which drivers 4*a* to 4*d* are placed side by side on a substrate, each including an independent IC chip having k (k is an integer of 2 or greater) output channels that are formed by dividing n (n is a natural number of 2 or greater) output channels of the source driver 40 into four parts.

The display panel 10 is composed of, for example, a liquid crystal or organic EL panel. The display panel 10 includes m (m is an integer of 2 or greater) gate lines g1 to gm, each extending in a horizontal direction of a two-dimensional screen, and n data lines D1 to Dn, each extending in a vertical direction of the two-dimensional screen. At each intersection of the gate lines and data lines, a display cell carrying a pixel is formed.

The drive control part 20 receives a video signal, detects a horizontal synchronization signal and a vertical synchronization signal from this video signal, and supplies the horizontal synchronization signal to the gate drivers 30A and 30B.

Based on the video signal, the drive control part 20 generates a series of pixel data PD representing a luminance level of each pixel in, for example, 8 bits. Furthermore, in response to the horizontal synchronization signal, the drive control part 20 generates load signals LDa to LDd where single pulses appear at different timings. The load signals LDa to LDd are signals that individually instruct the drivers 4*a* to 4*d* to capture the pixel data.

The drive control part 20 supplies, to the source driver 40, a video data signal DVS which includes the series of pixel data PD, a reference clock signal CLK, and the load signals LDa to LDd.

The gate driver 30A is connected to one end of each of the gate lines g1 to gm; the gate driver 30B is connected to the other end of each of the gate lines g1 to gm. The gate drivers 30A and 30B generate gate pulses synchronized with the horizontal synchronization signal, and sequentially apply these gate pulses to each of the gate lines g1 to gm of the display panel 10.

The source driver 40 receives the video data signal DVS, and extracts, from the video data signal DVS, the series of pixel data PD, the reference clock signal CLK, and the load signals LDa to LDd.

Next, in response to the load signals LDa to LDd, the source driver 40 captures n pieces of pixel data PD from the series of pixel data PD.

Here, the source driver 40 converts the captured n pieces of pixel data PD into n voltages having voltage values corresponding to the luminance levels indicated by each, at different timings with the reference clock signal CLK as a starting point. The source driver 40 generates pixel drive signals G1 to Gn respectively indicating the converted n voltages and outputs the same to the data lines D1 to Dn of the display panel 10.

Specifically, the driver 4*a* constituting the source driver 40 captures k pieces of pixel data PD from the series of pixel data PD in response to the load signal LDa, and converts the k pieces of pixel data PD respectively into k voltages at different timings with the reference clock signal CLK as the starting point. The driver 4*a* generates pixel drive signals G1 to Gk indicating the converted k voltages and outputs the same to the data lines D1 to Dk of the display panel 10. The driver 4*b* captures k pieces of pixel data PD from the series of pixel data PD in response to the load signal LDb, and converts the k pieces of pixel data PD respectively into k voltages at different timings with the reference clock signal CLK as the starting point. The driver 4*b* generates pixel drive signals G(k+1) to Gr (where r is 2·k) indicating the converted k voltages and outputs the same to the data lines D(k+1) to Dr of the display panel 10.

The driver 4*c* captures k pieces of pixel data PD from the series of pixel data PD in response to the load signal LDc, and converts the k pieces of pixel data PD respectively into k voltages at different timings with the reference clock signal CLK as the starting point. The driver 4*c* generates pixel drive signals G(r+1) to Gy (where y is 3·k) indicating the converted k voltages and outputs the same to the data lines D(r+1) to Dy of the display panel 10. The driver 4*d* captures k pieces of pixel data PD from the series of pixel data PD in response to the load signal LDd, and converts the k pieces of pixel data PD respectively into k voltages at different timings with the reference clock signal CLK as the starting point. The driver 4*d* generates pixel drive signals G(y+1) to Gn indicating the converted k voltages and outputs the same to the data lines D(y+1) to Dn of the display panel 10.

The drivers 4*a* to 4*d* have the same internal configuration.

Figure 2:
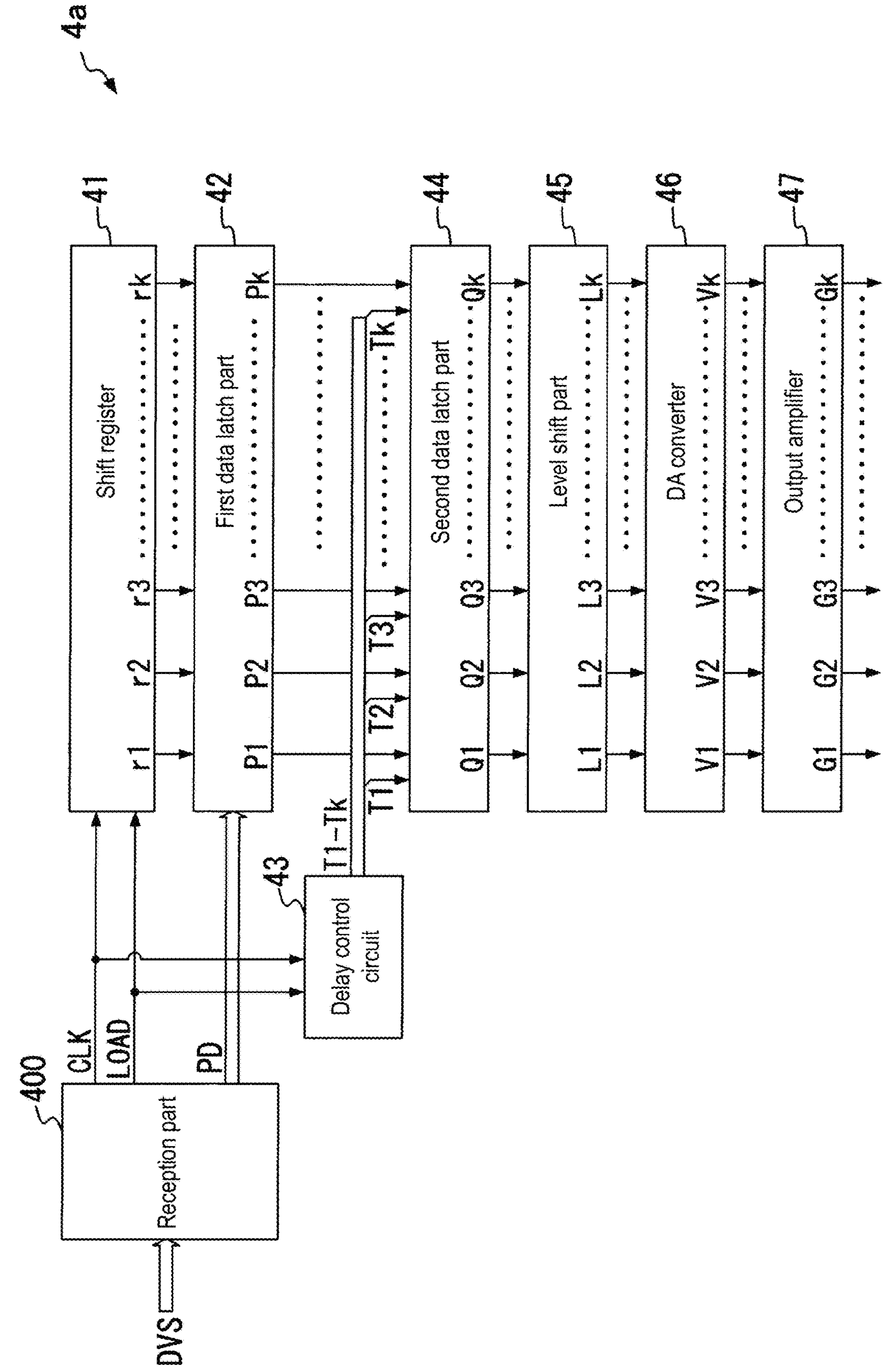
FIG. 2 is a block diagram showing an internal configuration of a driver 4*a*.

FIG. 2 is a block diagram showing the internal configuration of each of the drivers 4*a* to 4*d* from which the driver 4*a* is extracted.

As shown in FIG. 2, the driver 4*a* includes a reception part 400, a shift register 41, a first data latch part 42, a delay control circuit 43, a second data latch part 44, a level shift part 45, a digital-to-analog (DA) converter 46, and an output amplifier 47.

The reception part 400 receives the video data signal DVS, and extracts, from the video data signal DVS, the series of pixel data PD and the reference clock signal CLK. Furthermore, the reception part 400 of the driver 4*a* extracts the load signal LDa from the video data signal DVS. The reception part 400 of the driver 4*b* extracts the load signal LDb from the video data signal DVS, the reception part 400 of the driver 4*c* extracts the load signal LDc, and the reception part 400 of the driver 4*d* extracts the load signal LDd.

The reception part 400 supplies the extracted reference clock signal CLK to the shift register 41 and the delay control circuit 43. Furthermore, in response to the extracted load signal LDa, the reception part 400 supplies, as a load signal LOAD, a binary signal including a single pulse transitioning, for example, from logic level 0 to logic level 1, to the shift register 41 and the delay control circuit 43. Furthermore, the reception part 400 supplies the extracted series of pixel data PD to the first data latch part 42.

Upon receiving the single-pulse load signal LOAD, the shift register 41 captures the load signal LOAD in response to the reference clock signal CLK, and sequentially shifts the same at a timing of the reference clock signal CLK, thereby generating k latch timing signals r1 to rk with mutually different timings. The shift register 41 supplies the latch timing signals r1 to rk to the first data latch part 42.

The first data latch part 42 receives the series of pixel data PD, captures each pixel data piece at the timing of the latch timing signals r1 to rk respectively, and supplies the captured k pieces of pixel data PD as pixel data P1 to Pk to the second data latch part 44.

In response to the single-pulse load signal LOAD and the reference clock signal CLK, the delay control circuit 43 generates output timing signals T1 to Tk where a single-pulse signal appears after gradually increasing delays, or output timing signals Tk to T1 where a single-pulse signal appears after gradually increasing delays. The delay control circuit 43 supplies the generated output timing signals T1 to Tk to the second data latch part 44.

The second data latch part 44 captures the pixel data P1 to Pk supplied from the first data latch part 42, and outputs, as pixel data Q1 to Qk respectively, to the level shift part 45 at the timing of a rising edge (or falling edge) of each of the output timing signals T1 to Tk.

That is, for example, the second data latch part 44 outputs the captured pixel data P1 as the pixel data Q1 at the timing of the rising edge of the output timing signal T1. The second data latch part 44 outputs the captured pixel data P2 as the pixel data Q2 at the timing of the rising edge of the output timing signal T2. In this manner, the second data latch part 44 outputs captured pixel data Pi (where i is an integer from 1 to k) as pixel data Qi at the timing of a rising edge of an output timing signal Ti.

The level shift part 45 performs, on each of the pixel data Q1 to Qk, level shift processing that increases an amplitude of a signal representing each bit constituting the pixel data, and supplies the resultants as high-voltage pixel data signals L1 to Lk to the DA converter 46.

The DA converter 46 converts each of the pixel data signals L1 to Lk into a gradation voltage having an analog voltage value corresponding to the luminance level represented by the pixel data signal, and supplies the gradation voltages as gradation voltages V1 to Vk to the output amplifier 47.

The output amplifier 47 individually amplifies the gradation voltages V1 to Vk and outputs the resultants as pixel drive signals G1 to Gn.

Figure 3:
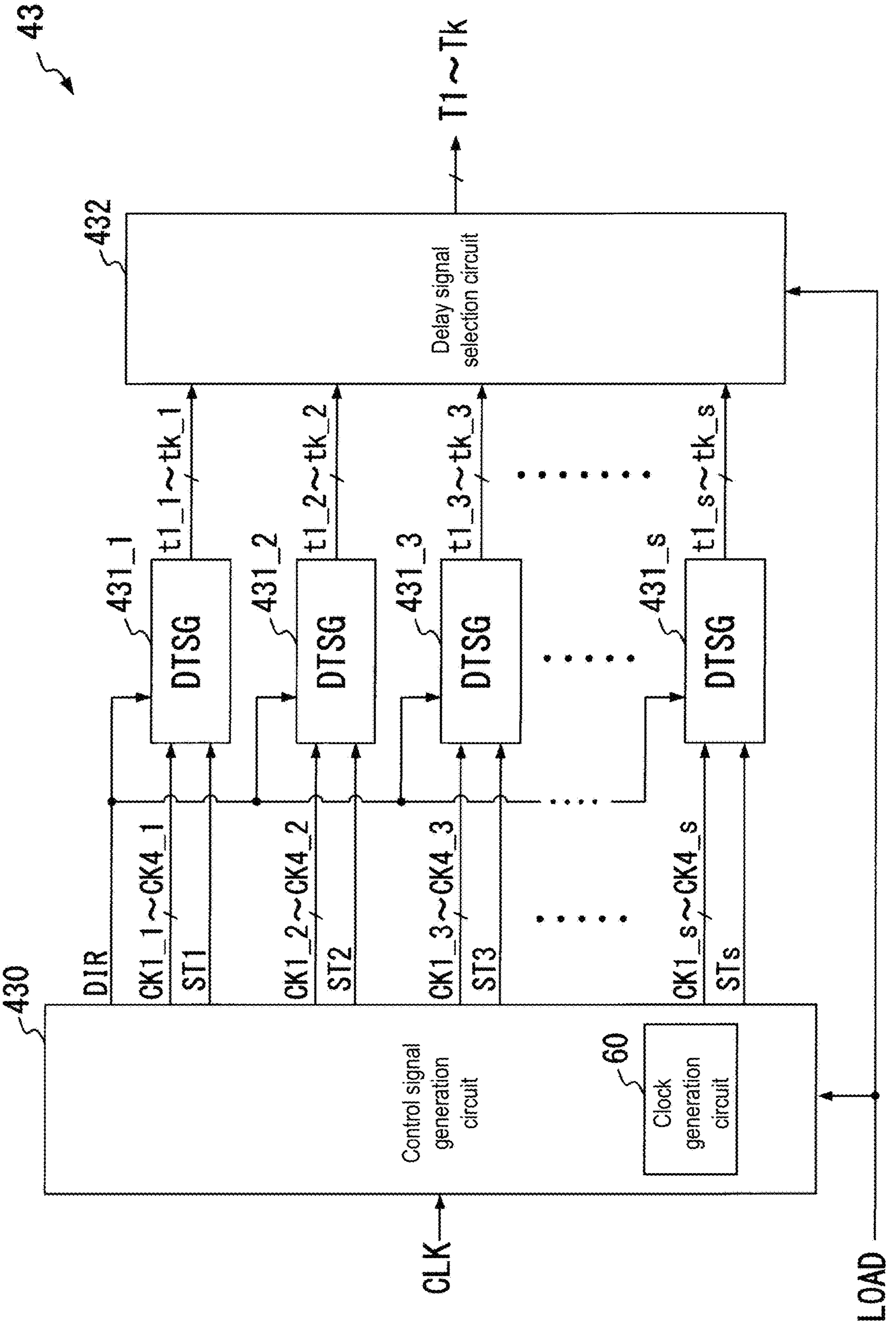
FIG. 3 is a block diagram showing an internal configuration of a delay control circuit 43.

FIG. 3 is a block diagram showing the internal configuration of the delay control circuit 43.

As shown in FIG. 3, the delay control circuit 43 includes a control signal generation circuit 430, delay timing signal generation circuits (DTSGs) 431_1 to 431_*s* (where s is an integer of 2 or greater), and a delay signal selection circuit 432.

The control signal generation circuit 430 generates a delay direction control signal DIR that specifies a direction to increase an output delay time for the first to kth output channels. Specifically, if the control signal generation circuit 430 itself belongs to the driver 4*a* or 4*b* shown in FIG. 1, the control signal generation circuit 430 generates the delay direction control signal DIR that specifies forward delay in which the output delay time increases from the first output channel toward the kth output channel. If the control signal generation circuit 430 itself belongs to the driver 4*c* or 4*d*, the control signal generation circuit 430 generates the delay direction control signal DIR that specifies reverse delay in which the output delay time increases from the kth output channel toward the first output channel.

The control signal generation circuit 430 supplies the generated delay direction control signal DIR to the delay timing signal generation circuits 431_1 to 431_*s*.

Figure 4:
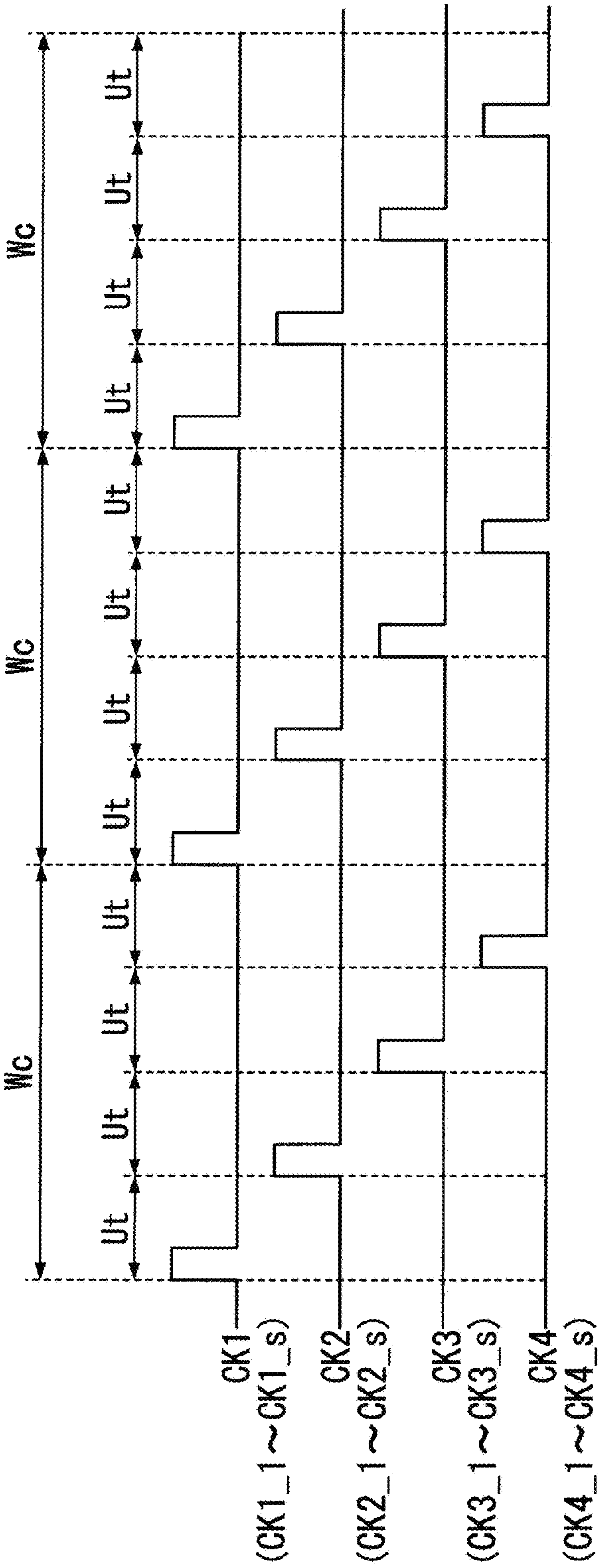
FIG. 4 is a time chart showing a form of clock signals CK1 to CK4.

The control signal generation circuit 430 includes a clock generation circuit 60 that generates clock signals CK1 to CK4 each having a period Wc and a phase difference of a unit delay time Ut between adjacent ones of them, as shown in FIG. 4. The period Wc is a length (4·Ut) obtained by multiplying Ut by 4, in which 4 is the number of clock signals. As shown in FIG. 4, the phase difference between the clock signals CK4 and CK1 is also the unit delay time Ut. Based on a group of clock signals (CK1 to CK4) shown in FIG. 4, the clock generation circuit 60 generates s sets (where s is an integer of 2 or greater) of clock signals CK1_1 to CK4_1, CK1_2 to CK4_2, CK1_3 to CK4_3, . . . , and CK1_*s* to CK4_*s*, each set having a different unit delay time Ut. Specifically, the length of the unit delay time Ut for each of the s sets of clock signal groups becomes shorter in the order of CK1_1 to CK4_1, CK1_2 to CK4_2, CK1_3 to CK4_3, CK1_4 to CK4_4, . . . , and CK1_*s* to CK4_*s*.

The control signal generation circuit 430 supplies the clock signals CK1_1 to CK4_1, CK1_2 to CK4_2, CK1_3 to CK4_3, CK1_4 to CK4_4, . . . , and CK1_*s* to CK4_*s* to the delay timing signal generation circuits 431_1 to 431_*s*, as shown in FIG. 3.

Furthermore, in response to the load signal LOAD, the control signal generation circuit 430 generates start pulse signals ST1 to STs (where s is an integer of 2 or greater) each including a single pulse that initiates the generation of delay timing signals.

The timing at which the single pulse appears in each of the start pulse signals ST1 to STs becomes progressively later in the order of start pulse signals ST1, ST2, ST3, . . . , and STs.

The control signal generation circuit 430 supplies the generated start pulse signals ST1 to STs to the delay timing signal generation circuits 431_1 to 431_s, as shown in FIG. 3.

Each of the delay timing signal generation circuits 431_1 to 431_s, in response to the delay direction control signal DIR, start pulse signal ST, and clock signals CK1 to CK4 that it receives, generates delay timing signals t1 to tk indicating the output timing at each of the first to kth output channels.

That is, the delay timing signal generation circuit 431_1 generates delay timing signals t1_1 to tk_1 in response to the delay direction control signal DIR, start pulse signal ST1, and clock signals CK1_1 to CK4_1. The delay timing signal generation circuit 431_2 generates delay timing signals t1_2 to tk_2 in response to the delay direction control signal DIR, start pulse signal ST2, and clock signals CK1_2 to CK4_2. The delay timing signal generation circuit 431_3 generates delay timing signals t1_3 to tk_3 in response to the delay direction control signal DIR, start pulse signal ST3, and clock signals CK1_3 to CK4_3.

Similarly, a delay timing signal generation circuit 431_i (where i is an integer from 4 to s) generates delay timing signals t1_i to tk_i in response to the delay direction control signal DIR, start pulse signal STi, and clock signals CK1_i to CK4_i.

The delay timing signal generation circuits 431_1 to 431_s have the same internal configuration.

Figure 5:
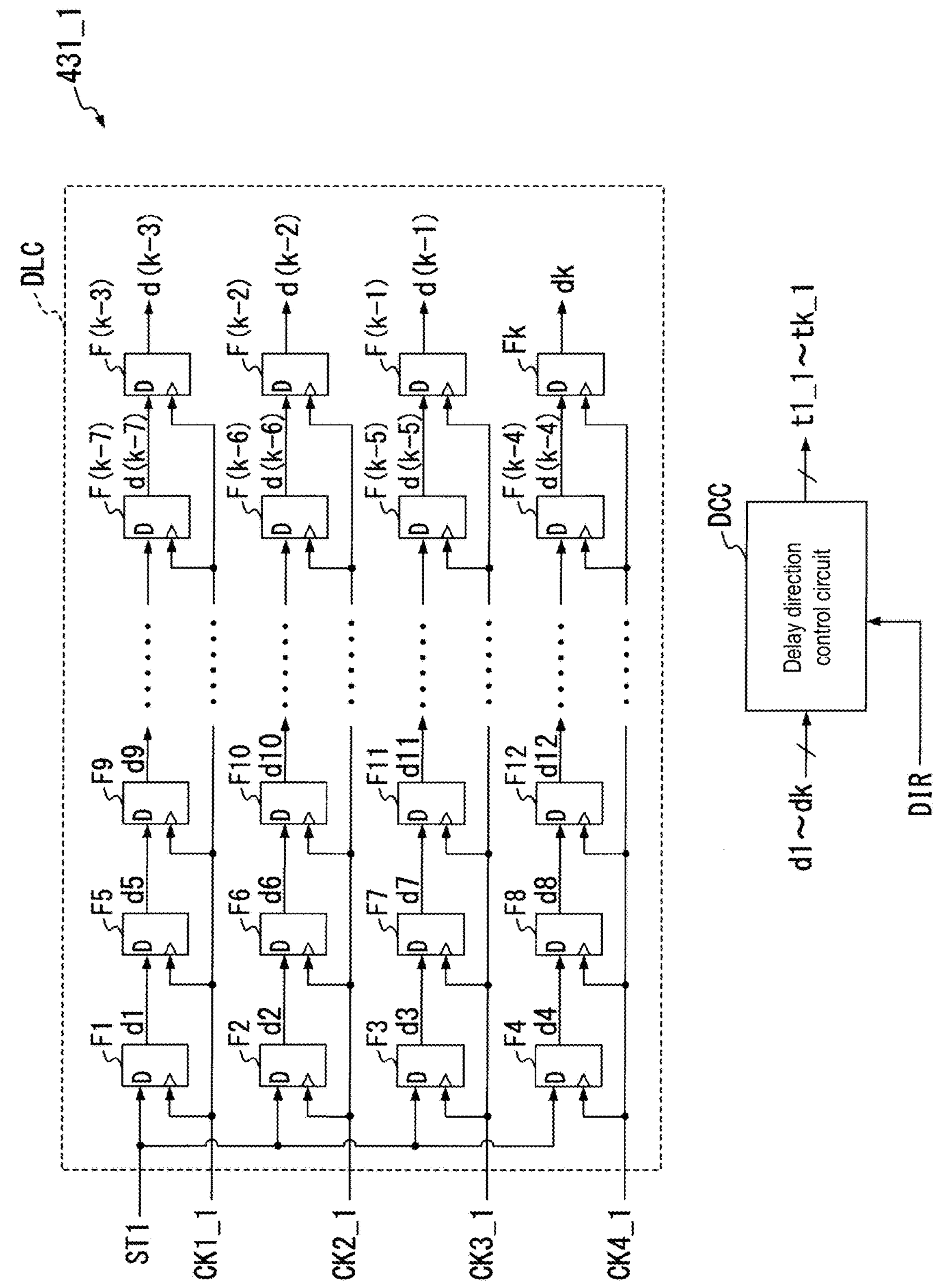
FIG. 5 is a circuit diagram showing an internal configuration of a delay timing signal generation circuit 431_1.

FIG. 5 is a block diagram showing the internal configuration of each of the delay timing signal generation circuits 431_1 to 431_s from which the delay timing signal generation circuit 431_1 is extracted.

As shown in FIG. 5, the delay timing signal generation circuit 431_1 includes a delay circuit DLC and a delay direction control circuit DCC.

The delay circuit DLC includes flip-flops F1 to Fk (where k is an integer of 2 or greater) corresponding to the first to kth output channels, respectively.

The delay circuit DLC includes: a first shift register in which F(4x−3) (where x is an integer of 1 or greater) flip-flops (referred to as DFFs) among the flip-flops F1 to Fk are connected in series; a second shift register in which F(4x−2) DFFs are connected in series; a third shift register in which F(4x−1) DFFs are connected in series; and a fourth shift register in which F(4x) DFFs are connected in series.

Upon receiving the start pulse signal ST1 at the first stage flip-flop F1, in response to the clock signal CK1_1, the first shift register shifts a single pulse included in the start pulse signal ST1 to the next stage DFF in the order of F1, F5, F9, . . . , F(k−7), and F(k−3), while delaying each by the period Wc.

Upon receiving the start pulse signal ST1 at the first stage flip-flop F2, in response to the clock signal CK2_1, the second shift register shifts a single pulse included in the start pulse signal ST1 to the next stage DFF in the order of F2, F6, F10, . . . , F(k−6), and F(k−2), while delaying each by the period Wc.

Upon receiving the start pulse signal ST1 at the first stage flip-flop F3, in response to the clock signal CK3_1, the third shift register shifts a single pulse included in the start pulse signal ST1 to the next stage DFF in the order of F3, F7, F11, . . . , F(k−5), and F(k−1), while delaying each by the period Wc.

Upon receiving the start pulse signal ST1 at the first stage flip-flop F4, in response to the clock signal CK4_1, the fourth shift register shifts a single pulse included in the start pulse signal ST1 to the next stage DFF in the order of F4, F8, F12, . . . , F(k−4), and Fk, while delaying each by the period Wc.

Here, the delay circuit DLC supplies, to the delay direction control circuit DCC, as delay signals d1 to dk, each of binary signals including a single pulse transitioning, for example, logic level 0 to logic level 1, the binary signals being output from the flip-flops F1 to Fk, respectively.

In the delay circuit DLC shown in FIG. 5, a circuit configuration of the delay circuit DLC is shown, taking as an example where k is an integer divisible by 4. However, k may also be an integer not divisible by 4. On this occasion, if k is an integer not divisible by 4, for example, (4x−1) (where x is an integer of 1 or greater), the final stage flip-flop Fk of the fourth shift register shown in FIG. 5 is deleted, and the final stage flip-flops of the first to third shift registers become F(k−2), F(k−1), and Fk, respectively.

Figure 6:
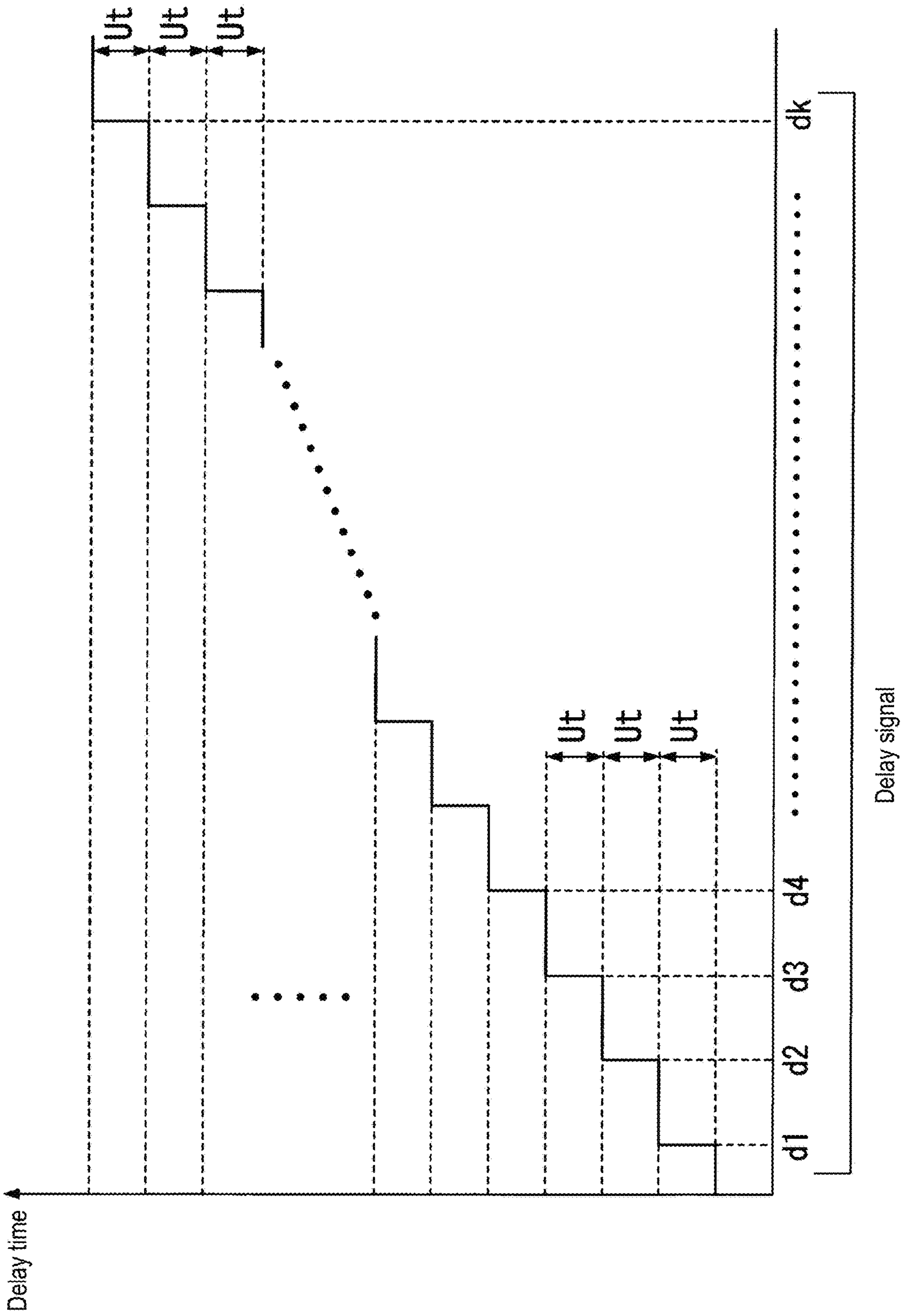
FIG. 6 is a diagram showing a delay form of delay signals d1 to dk.

FIG. 6 is a diagram showing a delay form in the delay signals d1 to dk.

As shown in FIG. 6, the delay signals d1 to dk increase in delay time between adjacent signals by the unit delay time Ut shown in FIG. 4, in the order of d1, d2, d3, . . . , and dk.

The delay direction control circuit DCC receives the delay direction control signal DIR along with the delay signals d1 to dk. If the delay direction control signal DIR indicates forward delay, the delay direction control circuit DCC outputs, as the delay timing signals t1_1 to tk_1, the delay signals in the order of the following correspondence, that is, d1 to dk.

$d1$: t1_1

$d2$: t2_1

$d3$: t3_1

. . .

$dk$: tk_1

On this occasion, similarly to the delay signals d1 to dk shown in FIG. 6, the delay timing signals t1_1 to tk_1 increase in delay time by the unit delay time Ut for each output channel from the first output channel to the kth output channel.

On the other hand, if the delay direction control signal DIR indicates reverse delay, the delay signals in the order of the following correspondence, that is, the delay signals dk to d1 obtained by putting the delay signals d1 to dk in descending order, are output as delay timing signals t1_1 to tk_1, respectively.

$dk$: t1_1

$d(k-1)$: $t2$_1

$d(k-2)$: $t3$_1

. . .

-continued $$d3: t(k-2)\_1$$

$$d2: t(k-1)\_1$$

$$d1: tk\_1$$

On this occasion, the delay timing signals t1_1 to tk_1 increase in delay time by the unit delay time Ut for each output channel in the opposite direction to the delay signals d1 to dk shown in FIG. 6, that is, from the kth output channel toward the first output channel.

Figure 7:
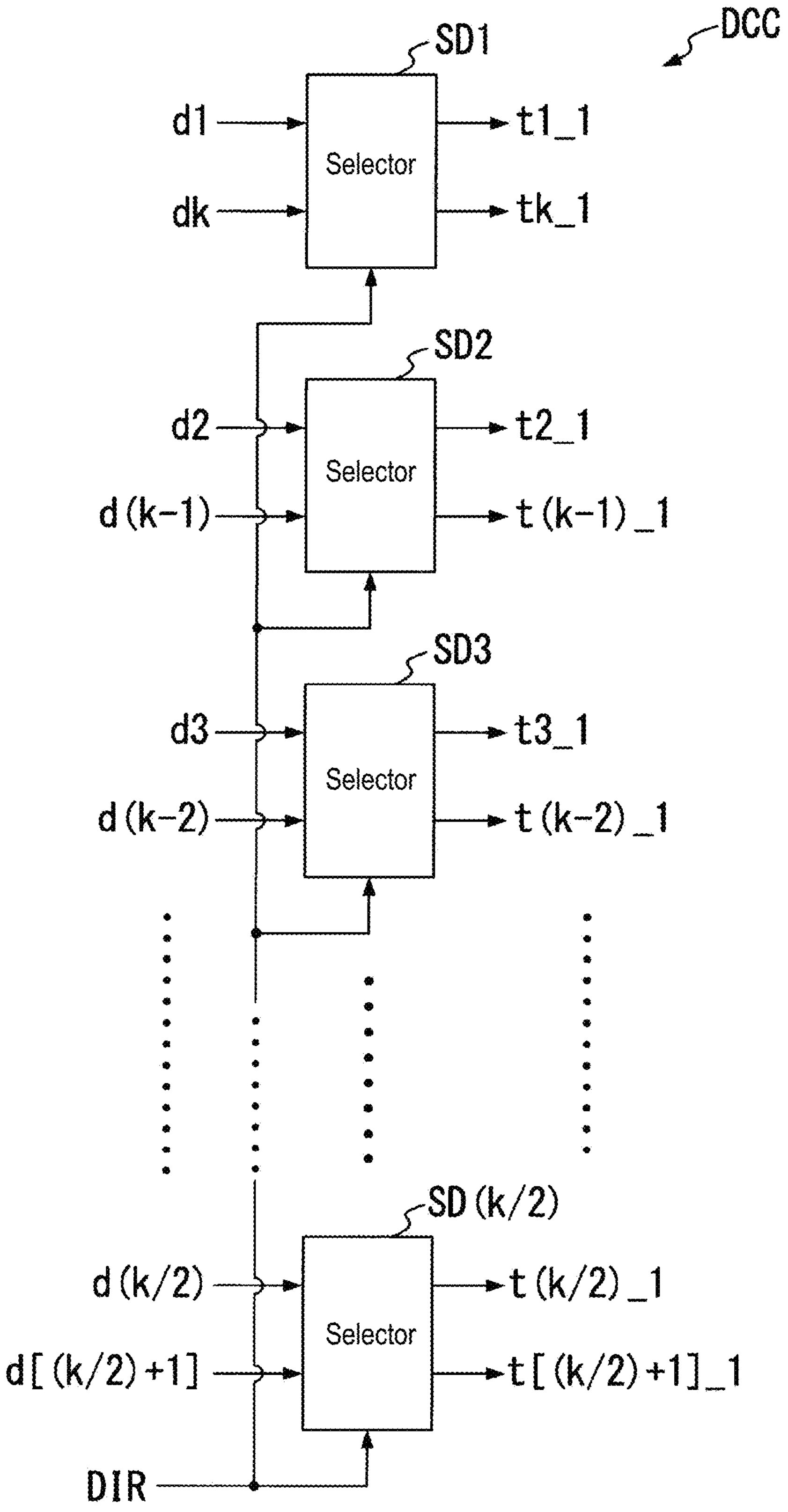
FIG. 7 is a circuit diagram showing a configuration of a delay direction control circuit DCC.

FIG. 7 is a circuit diagram showing an example of the internal configuration of the delay direction control circuit DCC.

In the example shown in FIG. 7, the delay direction control circuit DCC includes selectors SD1 to SD(k/2).

As shown in FIG. 7, the selectors SD1 to SD(k/2) commonly receive the delay direction control signal DIR. Furthermore, the selectors SD1 to SD(k/2) receive a pair of delay signals from among the delay signals d1 to dk as follows:

$$SD1: d1, dk$$

$$SD2: d2, d(k-1)$$

$$SD3: d3, d(k-2)$$

$$SD4: d4, d(k-3)$$

$$\ldots$$

$$SD(k/2): d[(k/2), d[(k/2)+1]$$

Here, if the delay direction control signal DIR indicates forward delay, the selectors SD1 to SD(k/2) output the delay signals d1 to d(k/2) as delay timing signals t1_1 to t(k/2)_1, and output the delay signals dk to d[(k/2)+1] as delay timing signals tk_1 to t[(k/2)+1]_1.

On the other hand, if the delay direction control signal DIR indicates reverse delay, the selectors SD1 to SD(k/2) output the delay signals d1 to d(k/2) as delay timing signals tk_1 to t[(k/2)+1]_1, and output the delay signals dk to d[(k/2)+1] as delay timing signals t1_1 to t(k/2)_1. For example, if the delay direction control signal DIR indicates forward delay, the selector SD1 outputs the delay signal d1 as the delay timing signal t1_1 and outputs the delay signal dk as the delay timing signal tk_1. On the other hand, if the delay direction control signal DIR indicates reverse delay, the selector SD1 outputs the delay signal d1 as the delay timing signal tk_1 and outputs the delay signal dk as the delay timing signal t1_1.

For example, if the delay direction control signal DIR indicates forward delay, the selector SD(k/2) outputs the delay signal d(k/2) as the delay timing signal t(k/2)_1 and outputs the delay signal d[(k/2)+1] as the delay timing signal t[(k/2)+1]_1. On the other hand, if the delay direction control signal DIR indicates reverse delay, the selector SD(k/2) outputs the delay signal d(k/2) as the delay timing signal t[(k/2)+1]_1 and outputs the delay signal d[(k/2)+1] as the delay timing signal t(k/2)_1.

Here, the delay timing signal generation circuits 431_1 to 431_*s* each having an internal configuration as shown in FIG. 5 and FIG. 7 supply, to the delay signal selection circuit 432, s sets of delay timing signal groups including the generated delay timing signals t1_1 to tk_1, t1_2 to tk_2, t1_3 to tk_3, . . . , and t1_*s* to tk_s.

Figure 8:
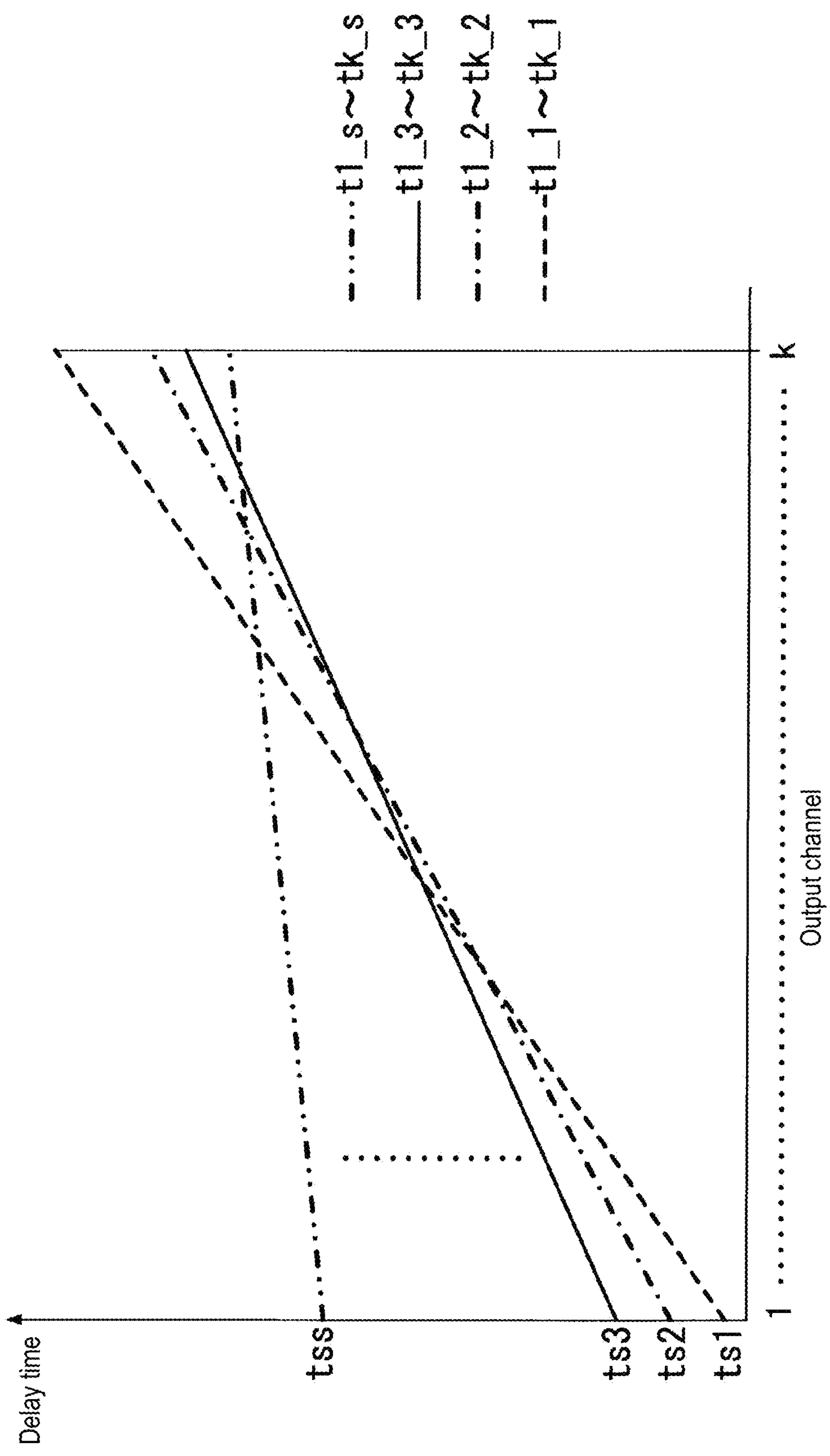
FIG. 8 is a diagram showing delay characteristics of delay timing signals t1_1 to tk_1, t1_2 to tk_2, t1_3 to tk_3, and t1_*s* to tk_s during forward delay.

FIG. 8 is a diagram showing delay characteristics for each output channel during forward delay, in which four sets of delay timing signals, t1_1 to tk_1, t1_2 to tk_2, t1_3 to tk_3, and t1_*s* to tk_s, are extracted from the s sets of delay timing signal groups.

For example, in response to the start pulse signal ST1, the delay timing signal generation circuit 431_1 generates the delay timing signals t1_1 to tk_1 in accordance with the delay characteristics represented by a slope of a straight line shown by a dashed line in FIG. 8, from the first output channel (t1_1) to the kth output channel (tk_1), with a time point at which time ts1 elapses as a start point.

In response to the start pulse signal ST2 that is delayed compared to the start pulse signal ST1, the delay timing signal generation circuit 431_2 generates the delay timing signals t1_2 to tk_2 in accordance with the delay characteristics represented by a slope of a straight line shown by a dash-dot line in FIG. 8, with a time point at which time ts2 (which is longer than time ts1) elapses as a start point. The slope of the delay line according to the delay timing signals t1_2 to tk_2 is gentler than the slope of the delay line according to the delay timing signals t1_1 to tk_1 shown by the dashed line.

In response to the start pulse signal ST3 that is delayed compared to the start pulse signal ST2, the delay timing signal generation circuit 431_3 generates the delay timing signals t1_3 to tk_3 in accordance with the delay characteristics represented by a slope of a straight line shown by a solid line in FIG. 8, with a time point at which time ts3 (which is longer than time ts2) elapses as a start point. The slope of the delay line according to the delay timing signals t1_3 to tk_3 is gentler than the slope of the delay line according to the delay timing signals t1_2 to tk_2 shown by the dash-dot line.

Similarly, in response to the start pulse signal STs that is delayed compared to the start pulse signal ST(s−1), the delay timing signal generation circuit 431_*s* generates the delay timing signals t1_*s* to tk_s in accordance with the delay characteristics represented by a slope of a straight line shown by a double dash-dot line in FIG. 8, with a time point at which time tss (which is longer than time ts(s−1)) elapses as a start point. The slope of the delay line according to the delay timing signals t1_*s* to tk_s is the gentlest among the delay timing signal groups generated within the delay control circuit 43.

That is, an increase rate of the delay time according to each delay timing signal from the first output channel to the kth output channel decreases in the following order:

first delay timing signal group (t1_1 to tk_1),
second delay timing signal group (t1_2 to tk_2),
third delay timing signal group (t1_3 to tk_3),
....
sth delay timing signal group (t1_s to tk_s).

The delay signal selection circuit 432 selects, for each of the first to kth output channels in the delay timing signals t1_1 to tk_1, t1_2 to tk_2, t1_3 to tk_3, . . . , and t1_*s* to tk_s, one delay timing signal with the earliest timing among the s delay timing signals corresponding to that output channel. The delay signal selection circuit 432 outputs, as the output timing signals T1 to Tk, the delay timing signals selected for each of the first to kth output channels.

Figure 9:
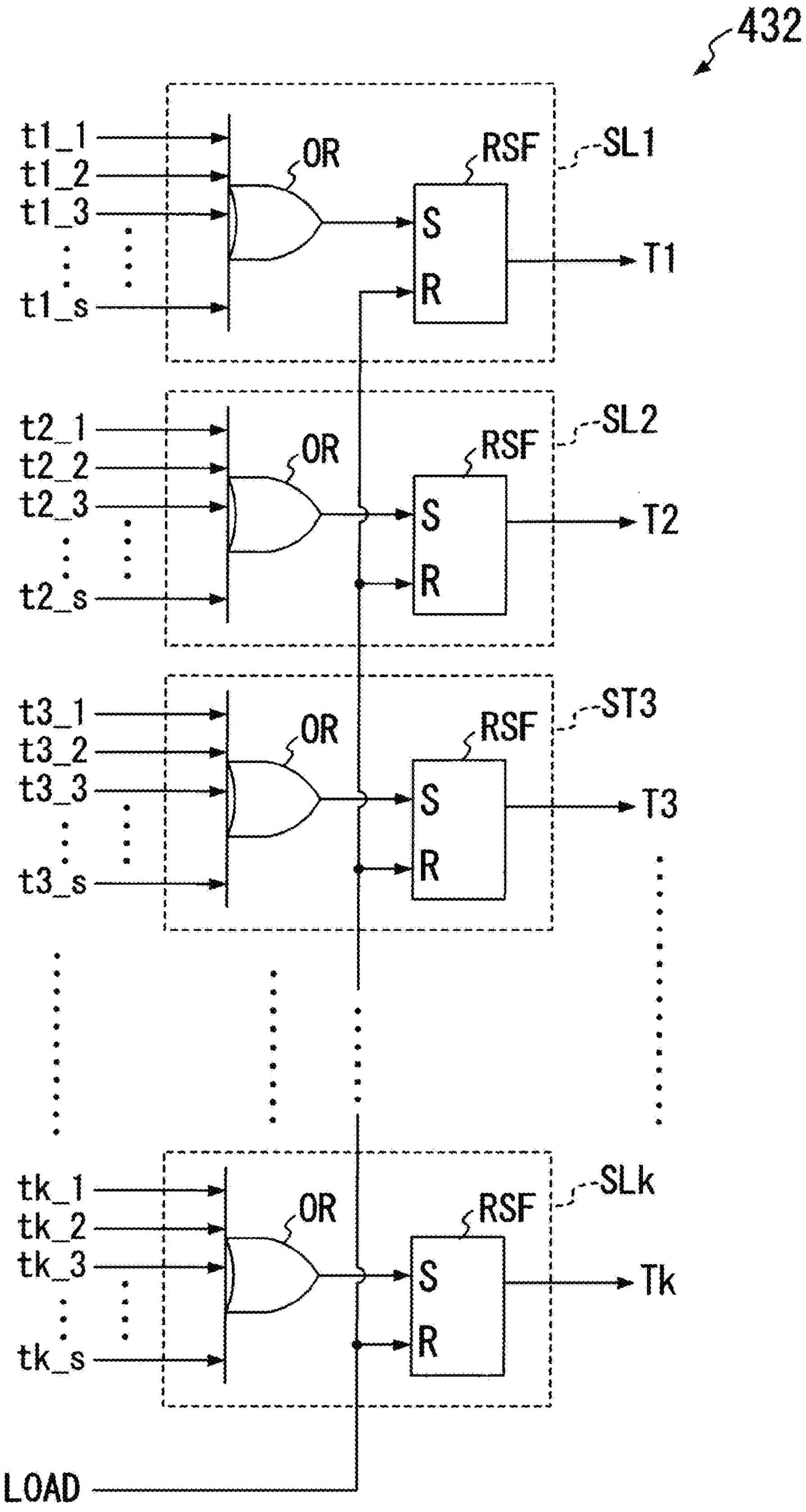
FIG. 9 is a circuit diagram showing an example of a configuration of a delay signal selection circuit 432.

FIG. 9 is a circuit diagram showing an example of a configuration of the delay signal selection circuit 432.

As shown in FIG. 9, the delay signal selection circuit 432 includes selection circuits SL1 to SLk corresponding to the first to kth output channels, respectively.

The selection circuits SL1 to SLk have the same internal configuration, namely an or gate OR and an RS flip-flop RSF.

The or gate OR included in each of the selection circuits SL1 to SLk receives s delay timing signals corresponding to the same output channel, and supplies a logical OR result to a set terminal S of the RS flip-flop RSF.

For example, the or gate OR included in the selection circuit SL1 receives delay timing signals t1_1 to t1_*s* corresponding to the first output channel. In the case where any one of the delay timing signals t1_1 to t1_*s* becomes logic level 1, the or gate OR supplies a set signal of logic level 1 to the set terminal S of the RS flip-flop RSF included in the selection circuit SL1. On the other hand, if all of the delay timing signals t1_1 to t1_*s* are logic level 0, the or gate OR supplies a set signal of logic level 0 to the set terminal S of the RS flip-flop RSF. For example, the or gate OR included in the selection circuit SLk receives delay timing signals tk_1 to tk_s corresponding to the kth output channel. In the case where any one of the delay timing signals tk_1 to tk_s becomes logic level 1, the or gate OR supplies a set signal of logic level 1 to the set terminal S of the RS flip-flop RSF included in the selection circuit SLk. On the other hand, if all of the delay timing signals tk_1 to tk_s are logic level 0, the or gate OR supplies a set signal of logic level 0 to the set terminal S of the RS flip-flop RSF.

The RS flip-flop RSF included in each of the selection circuits SL1 to SLk receives the load signal LOAD at its reset terminal R, and enters a reset state in the case where the load signal LOAD indicates logic level 1. Accordingly, the RS flip-flops RSF included in the selection circuits SL1 to SLk output the output timing signals T1 to Tk that maintain a logic level 0 state.

Subsequently, in the case where the set signal of logic level 1 is supplied to its set terminal S, the RS flip-flop RSF included in each of the selection circuits SL1 to SLk enters a set state, and outputs an output timing signal that maintains a logic level 1 state.

For example, the RS flip-flop RSF included in the selection circuit SL1, upon receiving the set signal of logic level 1 supplied from the or gate OR while the RS flip-flop RSF itself is in the reset state, outputs the output timing signal T1 transitioning from the logic level 0 state to logic level 1 at that timing. That is, the RS flip-flop RSF included in the selection circuit SL1 outputs the output timing signal T1 transitioning from the logic level 0 state to logic level 1 at a timing of a delay timing signal that first transitions from the logic level 0 state to logic level 1 among the delay timing signals t1_1 to t1_*s* corresponding to the first output channel.

For example, the RS flip-flop RSF included in the selection circuit SLk, upon receiving the set signal of logic level 1 supplied from the or gate OR while the RS flip-flop RSF itself is in the reset state, outputs the output timing signal Tk transitioning from the logic level 0 state to logic level 1 at that timing. That is, the RS flip-flop RSF included in the selection circuit SLk outputs the output timing signal Tk transitioning from the logic level 0 state to logic level 1 at a timing of a delay timing signal that first transitions from the logic level 0 state to logic level 1 among the delay timing signals tk_1 to tk_s corresponding to the kth output channel.

Operation Example where s=2 and DIR: Forward Delay

The following describes an operation of generating the output timing signals T1 to Tk by the delay control circuit 43, taking as an example a case of forward delay where s=2, that is, where there are only two delay timing signal generation circuits, namely 431_1 and 431_2.

On this occasion, the control signal generation circuit 430 shown in FIG. 3 supplies the delay direction control signal DIR specifying forward delay to the delay timing signal generation circuits 431_1 and 431_2. In response to the load signal LOAD, the control signal generation circuit 430 supplies, to the delay timing signal generation circuit 431_1, the start pulse signal ST1 in which a single pulse appears, and the clock signals CK1_1 to CK4_1 shown in FIG. 4.

Furthermore, in response to the load signal LOAD, the control signal generation circuit 430 supplies, to the delay timing signal generation circuit 431_2, the start pulse signal ST2 in which a single pulse appears at a timing delayed from the start pulse signal ST1, and the clock signals CK1_2 to CK4_2 shown in FIG. 4.

The length of the unit delay time Ut of the clock signals CK1_2 to CK4_2 supplied to the delay timing signal generation circuit 431_2 is shorter than that of the unit delay time Ut of the clock signals CK1_1 to CK4_1 supplied to the delay timing signal generation circuit 431_1. That is, a frequency of the clock signals CK1_2 to CK4_2 is higher than a frequency of the clock signals CK1_1 to CK4_1.

Figure 10A:
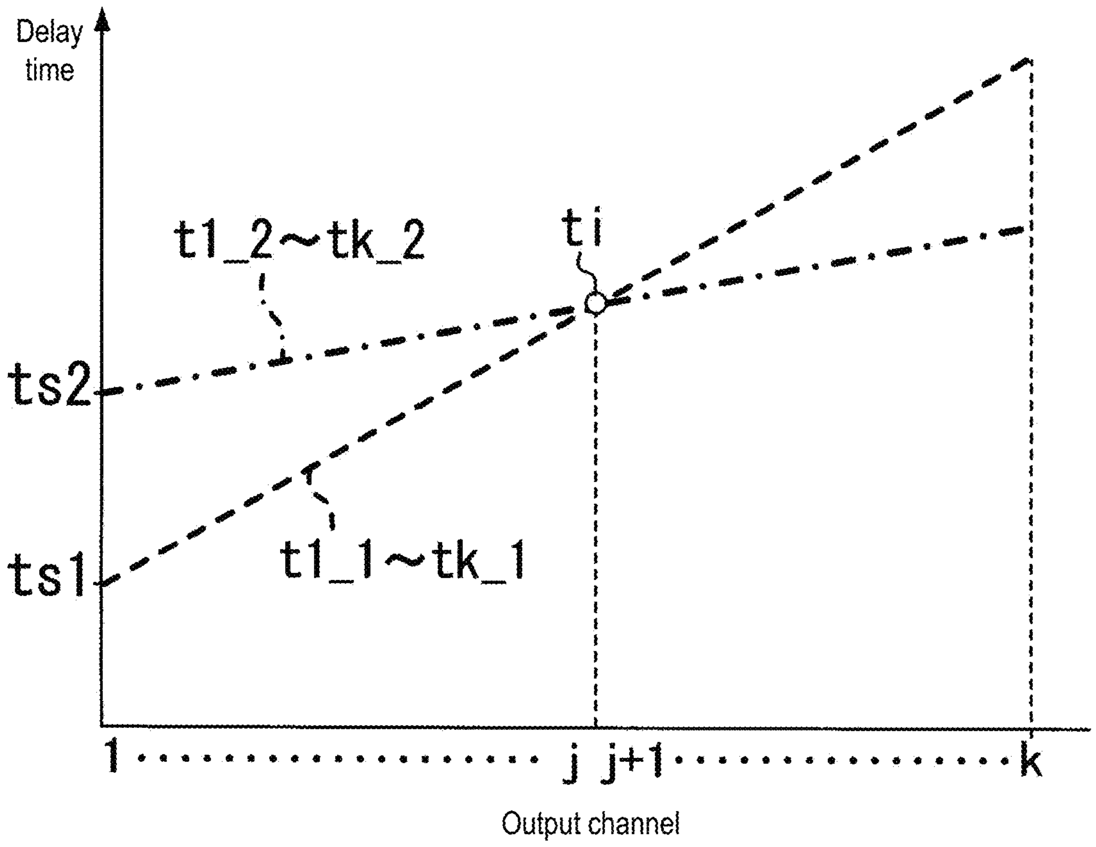
FIG. 10A is a diagram showing delay characteristics of each of the delay timing signals t1_1 to tk_1 and t1_2 to tk_2, taking as an example a case of forward delay where s=2.

FIG. 10A is a diagram showing delay characteristics of each of the delay timing signals t1_1 to tk_1 and t1_2 to tk_2 generated by the delay timing signal generation circuits 431_1 and 431_2 based on the control of the control signal generation circuit 430 described above.

In response to the load signal LOAD, the delay timing signal generation circuit 431_1 generates the delay timing signals t1_1 to tk_1 increasing in delay time from the first output channel toward the kth output channel, with a time point at which only time ts1 is delayed as a start point, as shown by a dashed line in FIG. 10A. On the other hand, in response to the load signal LOAD, the delay timing signal generation circuit 431_2 generates the delay timing signals t1_2 to tk_2 increasing in delay time from the first output channel toward the kth output channel, with a time point at which only time ts2 is delayed as a start point, as shown by a dash-dot line in FIG. 10A.

Since the frequency of the clock signals CK1_2 to CK4_2 is higher than that of the clock signals CK1_1 to CK4_1, as shown in FIG. 10A, the slope of the delay line (dash-dot line) according to the delay timing signals t1_2 to tk_2 is smaller than the slope of the delay line (dashed line) according to the delay timing signals t1_1 to tk_1. That is, an increase rate of the delay time according to the delay timing signals t1_2 to tk_2 is lower than an increase rate of the delay time according to the delay timing signals t1_1 to tk_1.

Accordingly, as shown in FIG. 10A, in the range of the first to jth (where j is an integer less than k) output channels, the delay timing signals t1_1 to tk_1 are shorter than the delay timing signals t1_2 to tk_2 in terms of the delay time of the same output channel. However, as shown in FIG. 10A, in the range of the (j+1)th to kth output channels, the delay timing signals t1_2 to tk_2 are shorter than the delay timing signals t1_1 to tk_1 in terms of the delay time of the same output channel.

That is, as shown in FIG. 10A, a magnitude relationship between the delay time according to the delay timing signals t1_1 to tk_1 and the delay time according to the delay timing signals t1_2 to tk_2 is reversed at an inflection point ti between the jth output channel and the (j+1)th output channel as a boundary.

Here, the delay signal selection circuit 432 shown in FIG. 3 compares the delay timing signals t1_1 to tk_1 and t1_2 to tk_2 at the same output channel, and selects the delay timing signal with shorter delay time for each of the first to kth output channels. The delay signal selection circuit 432 outputs, as the output timing signals T1 to Tk, the delay timing signals selected for each of the first to kth output channels.

Figure 10B:
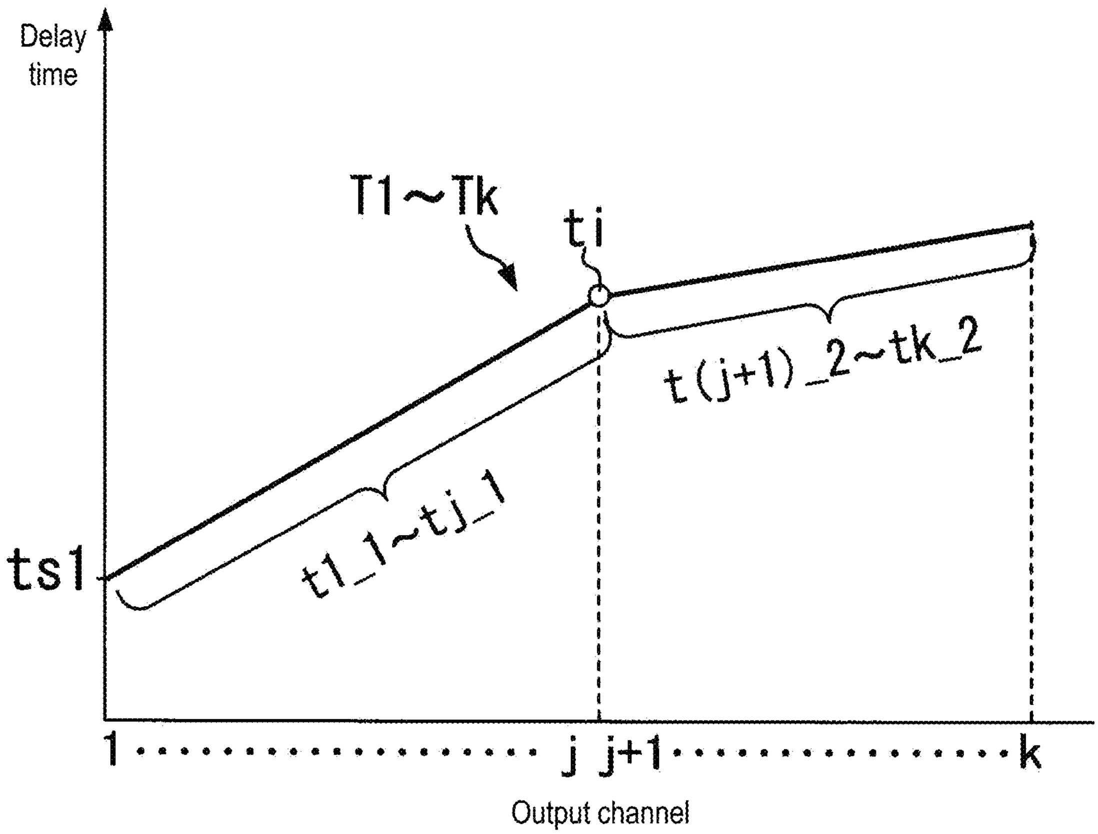
FIG. 10B is a diagram showing delay characteristics of output timing signals T1 to Tk generated by delay timing signals t1_1 to tj_1 and t(j+1)_2 to tk_2, taking as an example a case of forward delay where s=2.

Accordingly, as shown in FIG. 10B, the delay timing signals t1_1 to tj_1 become T1 to Tj among the output timing signals T1 to Tk, and the delay timing signals t(j+1)_2 to tk_2 become T(j+1) to tk among the output timing signals T1 to Tk.

Operation Example where s=3 and DIR: Forward Delay

Next, described is an operation of generating the output timing signals T1 to Tk by the delay control circuit 43, taking as an example a case of forward delay where s=3, that is, where there are only three delay timing signal generation circuits, namely 431_1 to 431_3.

On this occasion, the control signal generation circuit 430 supplies the delay direction control signal DIR specifying forward delay to the delay timing signal generation circuits 431_1, 431_2, and 431_3.

In response to the load signal LOAD, the control signal generation circuit 430 supplies, to the delay timing signal generation circuit 431_1, the start pulse signal ST1 in which a single pulse appears, and the clock signals CK1_1 to CK4_1 shown in FIG. 4. In response to the load signal LOAD, the control signal generation circuit 430 supplies, to the delay timing signal generation circuit 431_2, the start pulse signal ST2 in which a single pulse appears at a timing delayed from the start pulse signal ST1, and the clock signals CK1_2 to CK4_2 shown in FIG. 4. Furthermore, in response to the load signal LOAD, the control signal generation circuit 430 supplies, to the delay timing signal generation circuit 431_3, the start pulse signal ST3 in which a single pulse appears at a timing delayed from the start pulse signal ST2, and the clock signals CK1_3 to CK4_3 shown in FIG. 4.

The length of the unit delay time Ut of the clock signals CK1_2 to CK4_2 is shorter than that of the unit delay time Ut of the clock signals CK1_1 to CK4_1, and the length of the unit delay time Ut of the clock signals CK1_3 to CK4_3 is shorter than that of the unit delay time Ut of the clock signals CK1_3 to CK4_3. That is, the frequency of the clock signals CK1_2 to CK4_2 is higher than the frequency of the clock signals CK1_1 to CK4_1, and a frequency of the clock signals CK1_3 to CK4_3 is higher than the frequency of the clock signals CK1_2 to CK4_2.

Figure 11A:
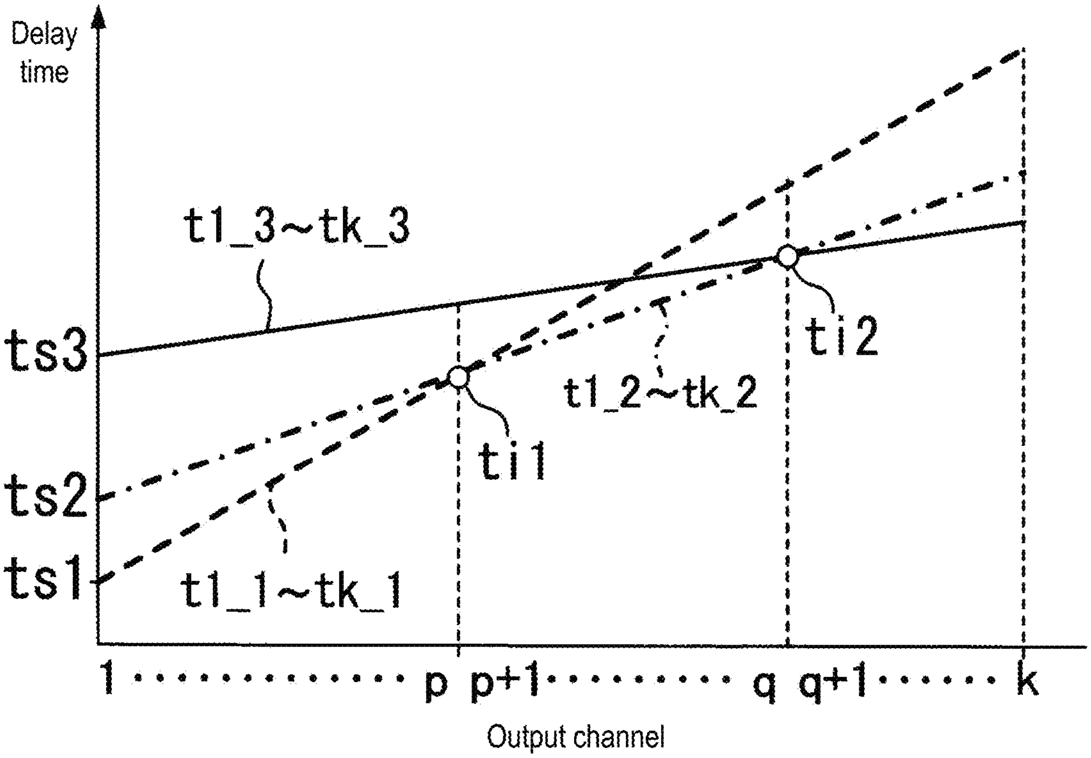
FIG. 11A is a diagram showing delay characteristics of each of delay timing signals t1_1 to tk_1, t1_2 to tk_2, and t1_3 to tk_3, taking as an example a case of forward delay where s=3.

FIG. 11A is a diagram showing delay characteristics of each of the delay timing signals t1_1 to tk_1, t1_2 to tk_2, and t1_3 to tk_3 generated by the delay timing signal generation circuits 431_1 to 431_3 based on the control of the control signal generation circuit 430 described above.

In response to the load signal LOAD, the delay timing signal generation circuit 431_1 generates the delay timing signals t1_1 to tk_1 increasing in delay time from the first output channel toward the kth output channel, with a time point at which only time ts1 is delayed as a start point, as shown by a dashed line in FIG. 11A. In response to the load signal LOAD, the delay timing signal generation circuit 431_2 generates the delay timing signals t1_2 to tk_2 increasing in delay time from the first output channel toward the kth output channel, with a time point at which only time ts2 is delayed as a start point, as shown by a dash-dot line in FIG. 11A. In response to the load signal LOAD, the delay timing signal generation circuit 431_3 generates the delay timing signals t1_3 to tk_3 increasing in delay time from the first output channel toward the kth output channel, with a time point at which only time ts3 is delayed as a start point, as shown by a solid line in FIG. 11A.

Since the frequency of the clock signals CK1_2 to CK4_2 is higher than that of the clock signals CK1_1 to CK4_1, as shown in FIG. 11A, the slope of the delay line (dash-dot line) according to the delay timing signals t1_2 to tk_2 is smaller than the slope of the delay line (dashed line) according to the delay timing signals t1_1 to tk_1. Since the frequency of the clock signals CK1_3 to CK4_3 is higher than that of the clock signals CK1_2 to CK4_2, as shown in FIG. 11A, the slope of the delay line (solid line) according to the delay timing signals t1_3 to tk_3 is smaller than the slope of the delay line (dash-dot line) according to the delay timing signals t1_2 to tk_2.

That is, an increase rate of the delay time according to the delay timing signals t1_3 to tk_3 is lower than the increase rate of the delay time according to the delay timing signals t1_2 to tk_2, and the increase rate of the delay time according to the delay timing signals t1_2 to tk_2 is lower than the increase rate of the delay time according to the delay timing signals t1_1 to tk_1.

Accordingly, as shown in FIG. 11A, in the range of the first to pth (where p is an integer less than k) output channels, the delay timing signals t1_1 to tk_1 among the delay timing signals t1_1 to tk_1, t1_2 to tk_2, and t1_3 to tk_3 are the shortest in terms of the delay time of the same output channel. As shown in FIG. 11A, in the range of the (p+1)th to qth (where q is an integer greater than p and less than k) output channels, the delay timing signals t1_2 to tk_2 among the delay timing signals t1_1 to tk_1, t1_2 to tk_2, and t1_3 to tk_3 are the shortest in terms of the delay time of the same output channel. As shown in FIG. 11A, in the range of the (q+1)th to kth output channels, the delay timing signals t1_3 to tk_3 among the delay timing signals t1_1 to tk_1, t1_2 to tk_2, and t1_3 to tk_3 are the shortest in terms of the delay time of the same output channel.

That is, as shown in FIG. 11A, the delay timing signals that provide the shortest delay time change from t1_1 to tk_1 to t1_2 to tk_2 at an inflection point ti1 between the pth output channels and the (p+1)th output channel as a boundary; the delay timing signals that provide the shortest delay time change from t1_2 to tk_2 to t1_3 to tk_3 at an inflection point ti2 between the qth output channel and the (q+1)th output channel as a boundary.

Here, the delay signal selection circuit 432 shown in FIG. 3 compares the delay timing signals t1_1 to tk_1, t1_2 to tk_2, and t1_3 to tk_3 at the same output channel, and selects the delay timing signal with shortest delay time for each of the first to kth output channels. The delay signal selection circuit 432 outputs, as the output timing signals T1 to Tk, the delay timing signals selected for each of the first to kth output channels.

Figure 11B:
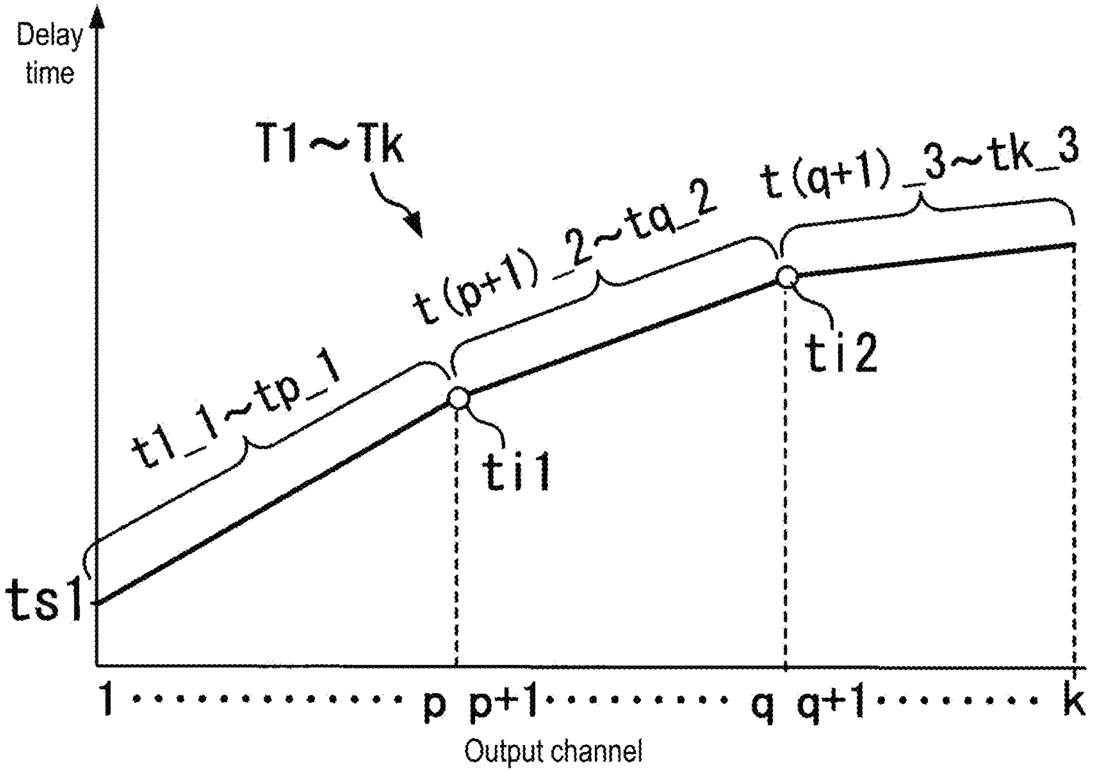
FIG. 11B is a diagram showing delay characteristics of output timing signals T1 to Tk generated by delay timing signals t1_1 to tp_1, t(p+1)_2 to tq_2, and t(q+1)_2 to tk_3, taking as an example a case of forward delay where s=3.

Accordingly, as shown in FIG. 11B, the delay timing signals t1_1 to tp_1 become T1 to Tp among the output timing signals T1 to Tk, the delay timing signals t(p+1)_2 to tq_2 become T(p+1) to Tq, and the delay timing signals t(q+1)_3 to tk_3 become T(q+1) to Tk.

Accordingly, according to the delay control circuit 43, as shown in FIG. 10B or FIG. 11B, it is possible to generate the output timing signals T1 to Tk in accordance with delay characteristics defining a quadratic curve where the increase rate of the delay time when the pixel drive signals G1 to Gk are respectively output decreases from the first output channel to the kth output channel.

Figure 12:
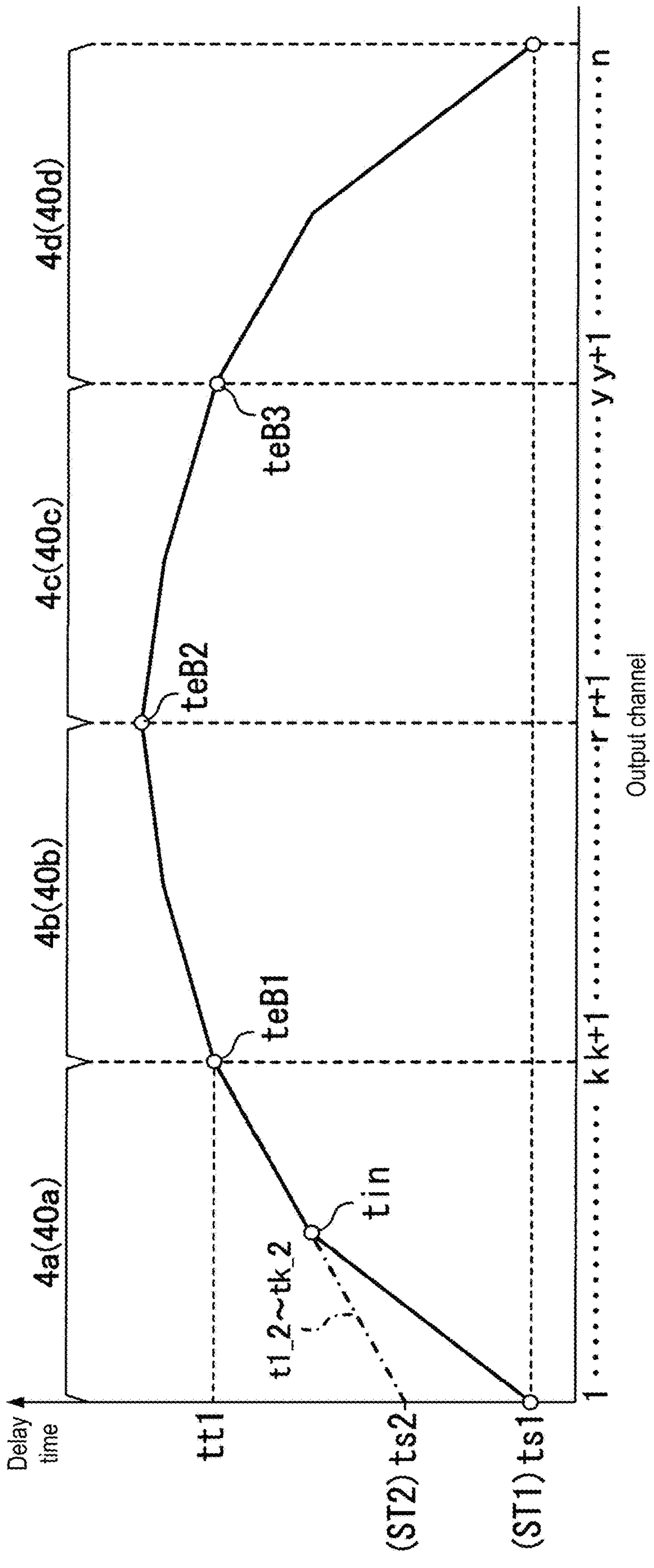
FIG. 12 is a diagram showing an example of delay characteristics of output timing signals T1 to Tk generated by drivers 4*a* to 4*d*.

On this occasion, in the source driver 40 shown in FIG. 1, by individually setting the timing and delay direction of the start pulse signal group by the delay control circuit 43 included in each of the drivers 4*a* to 4*d*, the output timing signals T1 to Tk in accordance with delay characteristics defining a quadratic curve as shown in FIG. 12, for example, can be obtained for all of the first to nth output channels. FIG. 12 shows the delay characteristics at the first to kth output channels, taking as an example the case where s=2, that is, where the delay control circuit 43 includes only two delay timing signal generation circuits, namely 431_1 and 431_2.

Accordingly, it is possible to output the pixel drive signals G1 to Gn corresponding to all of the first to nth output channels at an output timing in accordance with delay characteristics defining a quadratic curve where the increase rate of the delay time decreases from both left and right ends of a screen toward a central portion of the screen as the delay characteristics.

Here, each delay control circuit 43 of the drivers 4*a* to 4*d* has built therein a setting register (not shown) in which information (hereinafter referred to as end point delay time information) specifying a delay time at the kth output channel, that is, an end point output channel, and delay direction information specifying a delay direction, have been stored in advance.

For example, in the example shown in FIG. 12, the setting register of the driver 4*a* stores the delay direction information specifying forward delay, and the end point delay time information specifying the delay time at an output timing teB1 shown in FIG. 12 corresponding to the end point output channel. The setting register of the driver 4*b* stores the information specifying forward delay, and the end point delay time information specifying the delay time at an output timing teB2 shown in FIG. 12 corresponding to the end point output channel. The setting register of the driver 4*c* stores the information specifying reverse delay, and the information specifying the end point delay time at the output timing teB2 shown in FIG. 12 corresponding to the end point output channel. The setting register of the driver 4*d* stores the information specifying reverse delay, and the end point delay time information specifying the delay time at an output timing teB3 shown in FIG. 12 corresponding to the end point output channel.

The control signal generation circuit 430 of each of the drivers 4*a* to 4*d* supplies, to the delay timing signal generation circuits 431_1 to 431_*s*, the delay direction control signal DIR indicating the delay direction shown by the delay direction information stored in the setting register.

Furthermore, based on the end point delay time information specified as described above, the control signal generation circuit 430 of each of the drivers 4*a* to 4*d* performs the following control so that, in a pair of adjacent drivers, the output timing matches between an end point output channel of one driver and a start point output channel of the other driver.

That is, in the delay control circuit 43, the output timing of the kth output channel, that is, the end point output channel, is always the delay timing signal tk_s generated by the delay timing signal generation circuit 431_*s*. On this occasion, for example, if s=2, tk_2 among the delay timing signals t1_2 to tk_2 generated by the delay timing signal generation circuit 431_2 becomes the output timing of the kth output channel (end point output channel) as shown in FIG. 10B. For example, if s=3, tk_3 among the delay timing signals t1_3 to tk_3 generated by the delay timing signal generation circuit 431_3 becomes the output timing of the kth output channel (end point output channel) as shown in FIG. 11B.

Based on the clock signals CK1_*s* to CK4_*s*, the delay timing signal generation circuit 431_*s* generates the delay timing signals t1_*s* to tk_s including tk_s described above. On this occasion, the delay time that changes between adjacent output channels in the delay timing signals t1_*s* to tk_s is the unit delay time Ut, and the total number of channels is k.

Thus, according to the following operation using the delay time (end point delay time) in the delay timing signal tk_s representing the output timing of the end point output channel, the delay time in the delay timing signal t1_*s* corresponding to the start point output channel among the delay timing signals t1_*s* to tk_s including said tk_s is obtained as a start point delay time.

$$\text{Start point delay time} = \text{end point delay time} - (k \times Ut)$$

Accordingly, the control signal generation circuit 430 outputs the start pulse signal STs at a timing such that the delay timing signal t1_*s* can be obtained at a time point at which the start point delay time has elapsed after the load signal LOAD is received. On this occasion, as shown in FIG. 8, the control signal generation circuit 430 sets the output timing of each of the other start pulse signals ST1 to ST(s−1) at a timing earlier than the start pulse signal STs.

For example, since s=2 in the example shown in FIG. 12, the delay timing signal that determines the end point delay time is the delay timing signal tk_2 generated by the delay timing signal generation circuit 431_2. In the example shown in FIG. 12, a time tt1 is specified as the delay time at the output timing teB1 represented by the delay timing signal tk_2, that is, the end point delay time. Furthermore, based on clock signals CK1_2 to CK4_2, the delay timing signal generation circuit 431_2 generates the delay timing signals t1_2 to tk_2 including tk_2 described above. Thus, according to the following operation based on the unit delay time Ut that increases between adjacent output channels in the delay timing signals t1_2 to tk_2, the total number of channels k, and the end point delay time tt1, the control signal generation circuit 430 of the driver 4*a* calculates a time ts2 at the start point at the first output channel, that is, the start point output channel.

$$ts2 = tt1 - (k \times Ut)$$

Accordingly, the control signal generation circuit 430 outputs the start pulse signal ST2 at a timing such that the delay timing signal t1_2 can be obtained at a time point at which the time ts2 has elapsed after the load signal LOAD is received. Furthermore, as shown in FIG. 12, the control signal generation circuit 430 outputs the start pulse signal ST1 at a timing of time ts1, which is earlier than the start pulse signal ST2.

Accordingly, according to the delay control circuit 43, as shown in FIG. 12 for example, by setting the delay time at the desired end point output channel for each driver (4*a* to 4*d*), in adjacent drivers, it is possible to match the output timing between the end point output channel of one driver and the start point output channel of the other driver.

Accordingly, since deviation in the output timing of pixel drive signals at a boundary between mutually adjacent drivers (IC chips) can be suppressed, it is possible to suppress display unevenness caused by this deviation.

Accordingly, according to each of the drivers 4*a* to 4*d*, it is possible to output the pixel drive signals at an output timing in accordance with delay characteristics defining a quadratic curve where the increase rate of the delay time decreases from an end toward a central portion of the screen, without causing display unevenness.

In the above embodiment, in adjacent drivers, in order to match the output timing between the end point output channel of one driver and the start point output channel of the other driver, as mentioned above, the operations using the delay time (end point delay time) at the end point output channel, the total number of channels k, and the unit delay time Ut are performed for each driver.

However, it is also possible to match the output timing at the end point output channel of one driver with the output timing at the start point output channel of the other driver between adjacent drivers without performing such operations.

Embodiment 2

Figure 13:
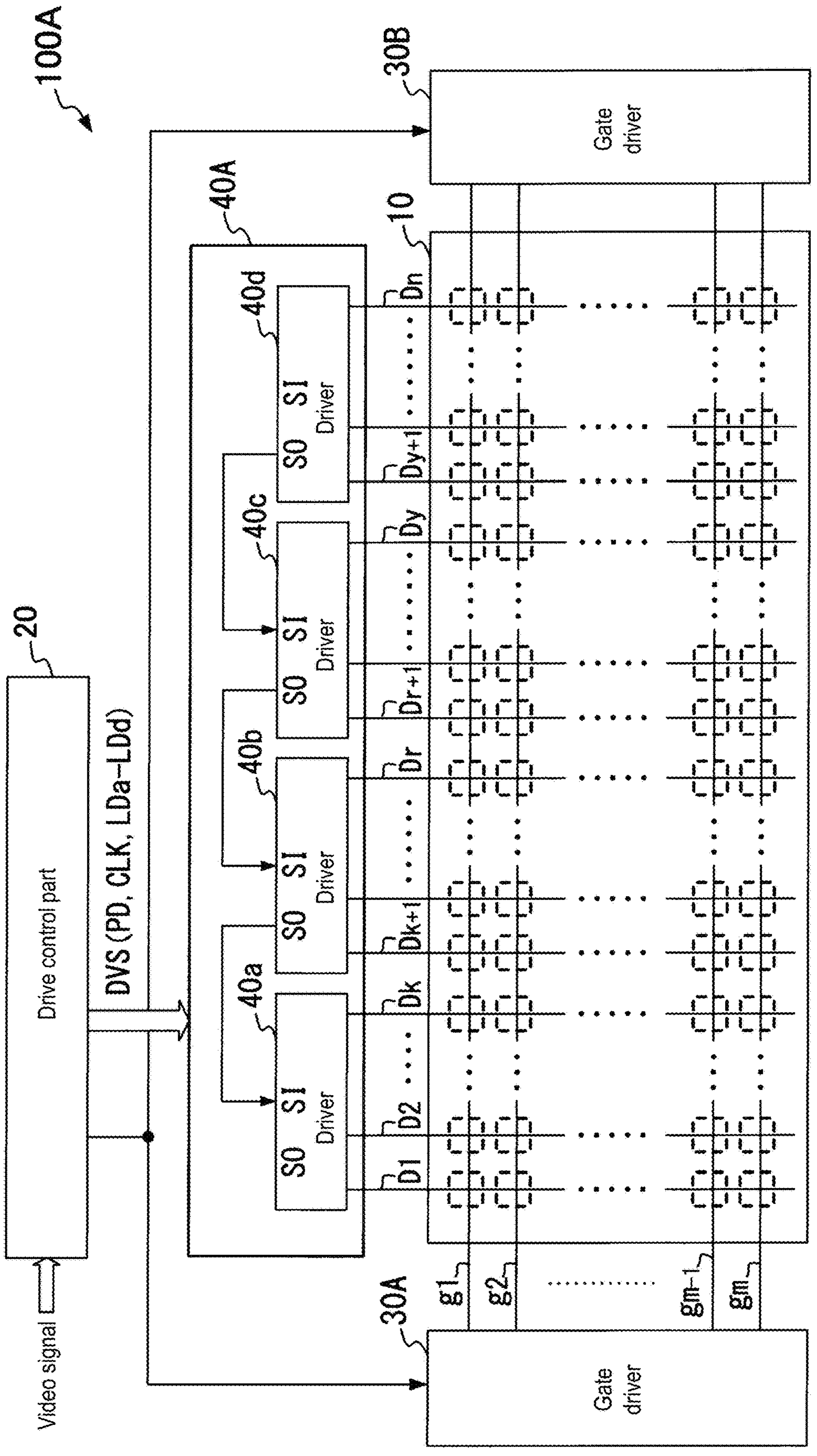
FIG. 13 is a block diagram showing a schematic configuration of a display device 100A including a display driver according to a second embodiment of the disclosure.

FIG. 13 is a block diagram showing a configuration of a display device 100A as another embodiment of the display device 100, which has been made in view of the above point.

The configuration shown in FIG. 13 is identical to that shown in FIG. 1 except for the point that a source driver 40A is adopted instead of the source driver 40.

As shown in FIG. 13, the source driver 40A is configured in which, instead of the drivers 4*a* to 4*d*, drivers 40*a* to 40*d* are placed side by side, each including an independent IC chip. In the drivers 40*a* to 40*d*, an input terminal SI and an output terminal SO are newly provided as external terminals of the IC chips, respectively. The other external terminals, namely k external terminals (not shown) for connecting to k data lines of the display panel 10, are the same as those of the drivers 4*a* to 4*d*.

As shown in FIG. 13, in the source driver 40A, the output terminal SO of the driver 40*d* is connected to the input terminal SI of the driver 40*c*, the output terminal SO of the driver 40*c* is connected to the input terminal SI of the driver 40*b*, and the output terminal SO of the driver 40*b* is connected to the input terminal SI of the driver 40*a*.

Figure 14:
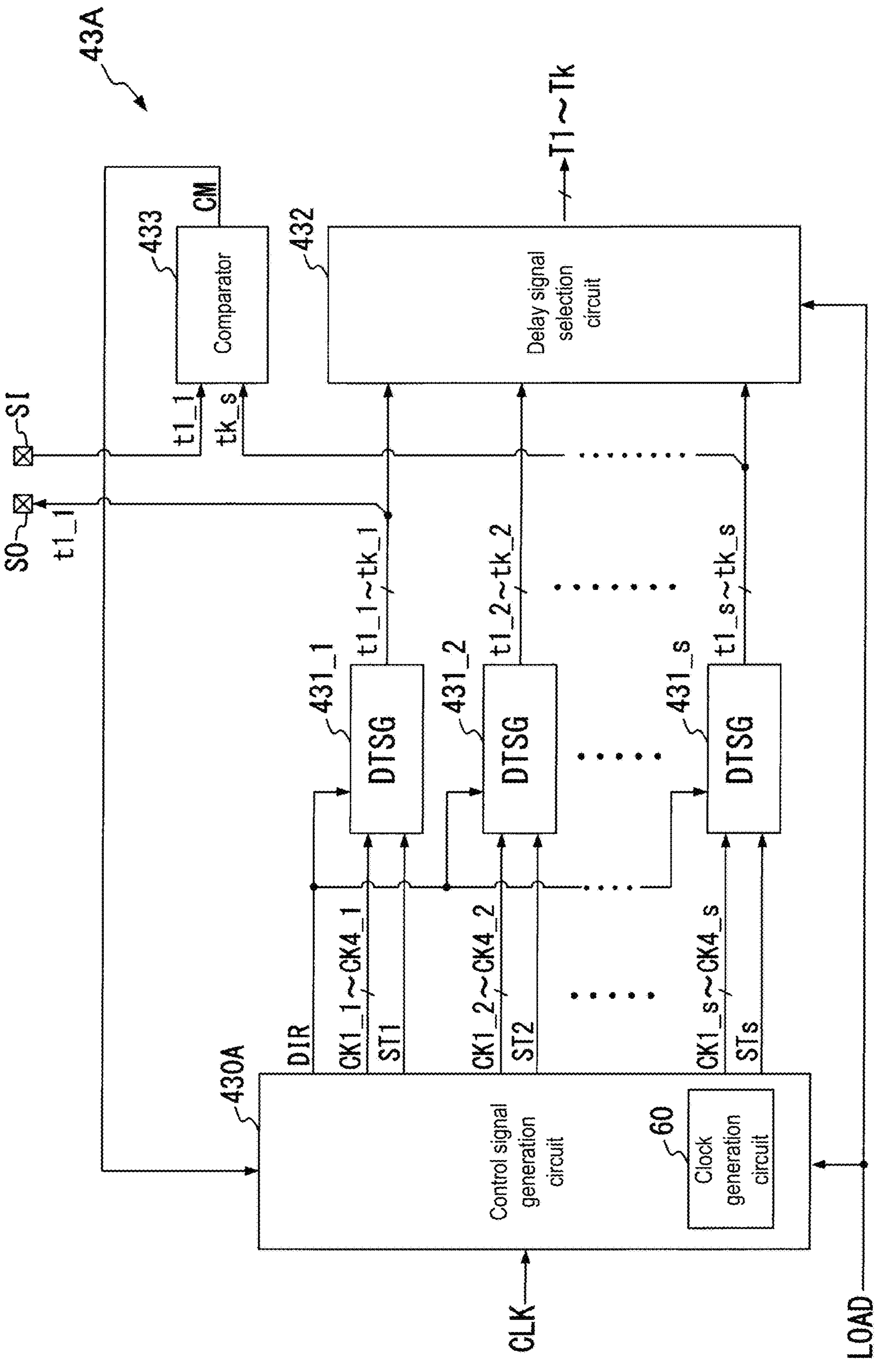
FIG. 14 is a block diagram showing an internal configuration of a delay control circuit 43A.

In the internal configuration of each of the drivers 40*a* to 40*d*, instead of the delay control circuit 43 shown in FIG. 2, a delay control circuit 43A having an internal configuration shown in FIG. 14 is adopted.

As shown in FIG. 14, the delay control circuit 43A adopts a control signal generation circuit 430A instead of the control signal generation circuit 430 shown in FIG. 3, and newly includes a comparator 433, an input terminal SI, and an output terminal SO. Except for the above, other configurations are identical to those shown in FIG. 3.

In the delay control circuit 43A, among the delay timing signals t1_1 to tk_1 generated by the delay timing signal generation circuit 431_1, t1_1 corresponding to the start point (first) output channel is output to the outside from the output terminal SO. That is, the driver 40*d* supplies the delay timing signal t1_1 generated by the delay timing signal generation circuit 431_1 of the driver 40*d* to the input terminal SI of the driver 40*c* that is connected to the output terminal SO of the driver 40*d* as shown in FIG. 13. The driver 40*c* supplies the delay timing signal t1_1 generated by the delay timing signal generation circuit 431_1 of the driver 40*c* to the input terminal SI of the driver 40*b* that is connected to the output terminal SO of the driver 40*c* as shown in FIG. 13. The driver 40*b* supplies the delay timing signal t1_1 generated by the delay timing signal generation circuit 431_1 of the driver 40*b* to the input terminal SI of the driver 40*a* that is connected to the output terminal SO of the driver 40*b* as shown in FIG. 13.

In the delay control circuit 43A, among the delay timing signals t1_*s* to tk_s generated by the delay timing signal generation circuit 431_*s*, tk_s corresponding to the end point (kth) output channel is supplied to the comparator 433.

Furthermore, in the delay control circuit 43A, the delay timing signal t1_1 received from an adjacent driver at the input terminal SI of the driver itself is supplied to the comparator 433. That is, the driver 40*c* supplies the delay timing signal t1_1 received from the driver 40*d* at its own input terminal SI to the comparator 433. The driver 40*b* supplies the delay timing signal t1_1 received from the driver 40*c* at its own input terminal SI to the comparator 433. The driver 40*a* supplies the delay timing signal t1_1 received from the driver 40*b* at its own input terminal SI to the comparator 433.

The comparator 433 compares a phase of the delay timing signal t1_1 generated by the delay timing signal generation circuit 431_1 of the adjacent driver with a phase of the delay timing signal tk_s generated by the delay timing signal generation circuit 431_2 of the driver itself.

On this occasion, if the phase of the delay timing signal tk_s is ahead of the phase of the delay timing signal t1_1, the comparator 433 supplies an adjustment signal CM indicating phase lead to the control signal generation circuit 430A. On the other hand, if the phase of the delay timing signal tk_s is behind the phase of the delay timing signal t1_1, the comparator 433 supplies the adjustment signal CM indicating phase lag to the control signal generation circuit 430A.

If a phase difference between the phase of the delay timing signal tk_s and the phase of the delay timing signal t1_1 is within a predetermined allowable range centered on zero, the comparator 433 supplies the adjustment signal CM indicating phase match to the control signal generation circuit 430A.

Based on the adjustment signal CM, the control signal generation circuit 430A executes the following delay timing adjustment processing in a vertical blanking period of the video signal: in adjacent drivers, the output timing at the end point output channel of one driver is matched with the output timing of the start point output channel of the other driver.

Figure 15:
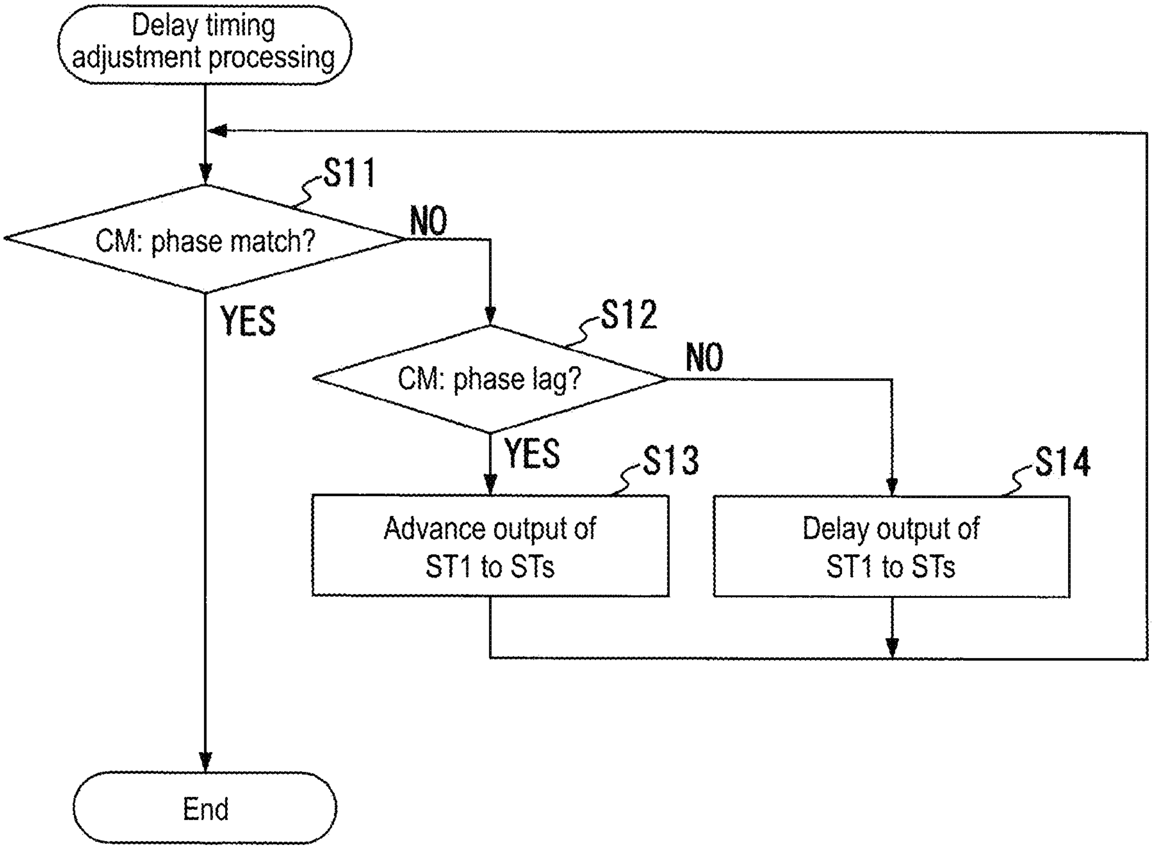
FIG. 15 is a flowchart showing a procedure of delay timing adjustment processing by a control signal generation circuit 430A.

FIG. 15 is a flowchart showing a procedure of the delay timing adjustment processing.

In FIG. 15, the control signal generation circuit 430A first determines whether the adjustment signal CM indicates phase match (step S11). In the case where it is determined that the adjustment signal CM indicates phase match in step S11, the control signal generation circuit 430A ends this delay timing adjustment processing and performs an operation similar to that of the control signal generation circuit 430 shown in FIG. 3 described above. That is, the control signal generation circuit 430A supplies the delay direction control signal DIR, start pulse signals ST1 to STs, and clock signals CK1_1 to CK4_1, CK1_2 to CK4_2, CK1_3 to CK4_3, CK1_4 to CK4_4, . . . , and CK1_*s* to CK4_*s* to the delay timing signal generation circuits 431_1 to 431_*s*.

In the case where it is determined that the adjustment signal CM does not indicate phase match in step S11, the control signal generation circuit 430A determines whether the adjustment signal CM indicates phase lag (step S12). In the case where it is determined that the adjustment signal CM indicates phase lag in step S12, the control signal generation circuit 430A uniformly advances, by a predetermined period compared to the previous time, the output timing of each of the start pulse signals ST1 to STs output in response to the load signal LOAD (step S13).

On the other hand, in the case where it is determined that the adjustment signal CM does not indicate phase lag in step S12, that is, in the case where the adjustment signal CM indicates phase lead, the control signal generation circuit 430A uniformly delays, by a predetermined period compared to the previous time, the output timing of each of the start pulse signals ST1 to STs output in response to the load signal LOAD (step S14).

After step S13 or S14 is executed, the control signal generation circuit 430A transitions to step S11 and executes the operations of steps S11 to S14 again. That is, the control signal generation circuit 430A adjusts (in the advance or delay direction) the output timing of each of the start pulse signals ST1 to STs until the output timing (tk_s) at the end point (kth) output channel of the driver matches the output timing (t1_1) at the start point (first) output channel of the adjacent driver.

Accordingly, according to the drivers 40*a* to 40*d* including the control signal generation circuit 430A, as shown in FIG. 12, at a boundary between adjacent drivers, an adjustment is automatically made to match the output timing at the end point (kth) output channel of one driver with the output timing at the start point (first) output channel of the other driver.

In Embodiments 1 and 2 described above, as shown in FIG. 5, four shift registers and four systems of clock signals CK1 to CK4 supplied to each shift register are used to generate the delay signals d1 to dk in the delay circuit DLC. However, the disclosure is not limited to this configuration. For example, the delay circuit DLC may be composed of a single system of shift register in which the flip-flops F1 to Fk shown in FIG. 5 are connected in cascade, and a single system of clock signal with a frequency (1/Ut) having a period of the unit delay time Ut shown in FIG. 4 may be supplied to this single system of shift register.

In the delay circuit DLC of the above embodiments, by generating the delay signals d1 to dk by a shift register including k flip-flops (F1 to Fk), and changing the frequency of the clock signals (CK1 to CK4) supplied to this shift register, various delay timing signal groups with different delay characteristics as shown in FIG. 8 are generated. However, for the delay circuit DLC, a configuration may be adopted in which k delay elements with variable delay times are connected in cascade instead of flip-flops, and the delay time of each delay element may be controlled by a delay time control signal.

In short, for the display driver according to the disclosure, which includes first to kth (where k is an integer of 2 or greater) output channels that output first to kth pixel drive signals respectively corresponding to each pixel indicated by a video signal, it is sufficient to have a configuration including the following delay control circuit and output part.

The output part (44 to 47) outputs the first to kth pixel drive signals (G1 to Gk) in response to the first to kth output timing signals (T1 to Tk).

The delay control circuit (43, 43A) generates the first to kth output timing signals that cause the first to kth pixel drive signals to be respectively output at timings after elapse of different delay times. On this occasion, the delay control circuit includes the following first to sth (where s is an integer of 2 or greater) delay timing signal generation circuits, control signal generation circuit, and delay signal selection circuit.

The first to sth delay timing signal generation circuits (431_1 to 431_*s*) generate first to sth (where s is an integer of 2 or greater) delay timing signal groups (t1_1 to tk_1, t1_2 to tk_2, t1_3 to tk_3, . . . , and t1_*s* to tk_s), each including first to kth delay timing signals corresponding to the first to kth output channels and bringing about the output timings that increase in delay time for each output channel from the first output channel to the kth output channel or from the kth output channel to the first output channel, and being mutually different in interval between the output timings brought about by the first to kth delay timing signals.

The control signal generation circuit (430, 430A) individually supplies start pulse signals (ST1 to STK) indicating the timing of starting sequential generation of the first to kth delay timing signals to each of the first to sth delay timing signal generation circuits.

The delay signal selection circuit (432) receives the first to sth delay timing signal groups generated by the first to sth delay timing signal generation circuits. For each of the first to kth output channels, the delay signal selection circuit (432) selects the delay timing signal with the earliest output timing from among s delay timing signals corresponding to that output channel, and supplies, as the first to kth output timing signals (T1 to Tk), k delay timing signals selected for each of the first to kth output channels to the output part (44 to 47).

Here, by changing the increase rate of the delay time according to the first to kth delay timing signals and changing the timing of starting the generation of the first to kth delay timing signals in each of s delay timing signal groups, it is possible to obtain the first to kth output timing signals having delay characteristics defining a quadratic curve. According to such a configuration, by determining a desired delay time as the delay time at the end point (kth) output channel by the first to kth output timing signals, it is possible to calculate the delay time at the start point (first) output channel of this display driver from the desired delay time. Accordingly, when outputting each pixel drive signal at an output timing in accordance with delay characteristics defining a quadratic curve to each of multiple data lines of a display panel by multiple drivers, it is possible to easily match the output timings of the pixel drive signals at a boundary between adjacent drivers.

Accordingly, according to the disclosure, it is possible to output multiple pixel drive signals to a display panel at an output timing in accordance with delay characteristics defining a quadratic curve where an increase rate of delay time decreases from an end toward a central portion of a screen, without causing display unevenness due to a deviation in output timing at a boundary between drivers.

What is claimed is:

1. A display driver comprising:

a first to kth output channels, outputting a first to kth pixel drive signals corresponding to each of a pixel indicated by a video signal, wherein k is an integer of 2 or greater;

a delay control circuit, sequentially supplying a first to kth output timing signals corresponding to the first to the kth output channels, the first to the kth output timing signals causing the first to the kth pixel drive signals to be respectively output at timings after elapse of different delay times; and an output part, outputting the first to the kth pixel drive signals at an output timing corresponding to a supply timing of the first to the kth output timing signals, wherein the delay control circuit comprises:

a first to sth delay timing signal generation circuits, generating a first to sth delay timing signal groups, each comprising first to kth delay timing signals corresponding to the first to the kth output channels and bringing about output timings that increase in delay time for each output channel from the first to the kth output channels or from the kth to the first output channels, and being mutually different in interval between the output timings brought about by the first to the kth delay timing signals, wherein s is an integer of 2 or greater;

a control signal generation circuit, individually supplying, to each of the first to the sth delay timing signal generation circuits, a start pulse signal indicating a timing of starting sequential generation of the first to the kth delay timing signals; and a delay signal selection circuit, receiving the first to the sth delay timing signal groups generated by the first to the sth delay timing signal generation circuits, selecting, for each of the first to the kth output channels, a delay timing signal with an earliest output timing from among s delay timing signals corresponding to that output channel, and supplying, as the first to the kth output timing signals, k delay timing signals selected for each of the first to the kth output channels to the output part, wherein the control signal generation circuit supplies the start pulse signal to each of the first to the sth delay timing signal generation circuits in order of the first to the sth delay timing signal generation circuits, and performs control on the first to the sth delay timing signal generation circuits in order of the first to the sth delay timing signal groups to lower an increase rate of the delay time according to the first to the kth delay timing signals belonging to that delay timing signal group.

2. The display driver according to claim 1, wherein the kth delay timing signal in the sth delay timing signal group becomes the kth output timing signal;

the control signal generation circuit holds information specifying, as an end point delay time, the delay time at the kth output channel as an end point output channel, calculates, as a start point delay time, a delay time of the first delay timing signal in the sth delay timing signal group according to following equation using the end point delay time, and determines a timing of supplying the start pulse signal to the sth delay timing signal generation circuit based on the start point delay time, start point delay time=end point delay time−(k×Ut)

wherein Ut represents a unit delay time per output channel.

3. The display driver according to claim 1, wherein each of the first to the sth delay timing signal generation circuits comprises:

a delay circuit, comprising a first to kth flip-flops, and sequentially shifting the start pulse signal through each of the first to the kth flip-flops in response to a clock signal while outputting signals output from each of the first to the kth flip-flops as a first to kth delay signals; and a delay direction control circuit, receiving a delay direction control signal specifying forward delay or reverse delay, and, in a case where the delay direction control signal indicates forward delay, outputting the first to the kth delay signals in this order as the first to the kth delay timing signals, and, in a case where the delay direction control signal indicates reverse delay, outputting the first to the kth delay signals in descending order as the first to the kth delay timing signals.

4. A display driver comprising:

a first to wth drivers, wherein w is an integer of 2 or greater, and each of the first to wth drivers comprises:

a first to kth output channels, outputting a first to kth pixel drive signals corresponding to each of a pixel indicated by a video signal, wherein k is an integer of 2 or greater;

a delay control circuit, sequentially supplying a first to kth output timing signals corresponding to the first to the kth output channels, the first to the kth output timing signals causing the first to the kth pixel drive signals to be respectively output at timings after elapse of different delay times; and an output part, outputting the first to the kth pixel drive signals at an output timing corresponding to a supply timing of the first to the kth output timing signals, wherein the delay control circuit comprises:

a first to sth delay timing signal generation circuits, generating a first to sth delay timing signal groups, each comprising a first to kth delay timing signals corresponding to the first to the kth output channels and bringing about output timings that increase in delay time for each of an output channel from the first output channel to the kth output channel or from the kth output channel to the first output channel, and being mutually different in interval between the output timings brought about by the first to the kth delay timing signals, wherein s is an integer of 2 or greater;

a control signal generation circuit, individually supplying, to each of the first to the sth delay timing signal generation circuits, a start pulse signal indicating a timing of starting sequential generation of the first to the kth delay timing signals; and a delay signal selection circuit, receiving the first to the sth delay timing signal groups generated by the first to the sth delay timing signal generation circuits, selecting, for each of the first to the kth output channels, a delay timing signal with an earliest output timing from among s delay timing signals corresponding to that output channel, and supplying, as the first to the kth output timing signals, k delay timing signals selected for each of the first to the kth output channels to the output part, wherein the control signal generation circuit supplies the start pulse signal to each of the first to the sth delay timing signal generation circuits in order of the first to the sth delay timing signal generation circuits, and performs control on the first to the sth delay timing signal generation circuits in order of the first to the sth delay timing signal groups to lower an increase rate of the delay time according to the first to the kth delay timing signals belonging to that delay timing signal group.

5. The display driver according to claim 4, wherein the first to the wth drivers are independent IC chips placed side by side on a substrate, and each of the first to the wth drivers comprises:

an output terminal, outputting to outside the first delay timing signal comprised in the first delay timing signal group of the driver;

an input terminal, for inputting from outside the first delay timing signal comprised in the first delay timing signal group of an adjacent driver; and a comparator, comparing a phase of the first delay timing signal input externally from the input terminal with a phase of the kth delay timing signal comprised in the sth delay timing signal group of the driver, and generating an adjustment signal that indicates phase lead in a case where the phase of the kth delay timing signal is ahead of the phase of the first delay timing signal and indicates phase lag in a case where the phase of the kth delay timing signal is behind the phase of the first delay timing signal;

the control signal generation circuit of each of the first to the wth drivers uniformly advances a timing of each of the start pulse signal individually supplied to each of the first to the sth delay timing signal generation circuits in the case where the adjustment signal indicates phase lag, and uniformly delays the timing of each of the start pulse signal in the case where the adjustment signal indicates phase lead, thereby performing adjustment in adjacent drivers among the first to the wth drivers to match the kth output timing signal of one driver with the first output timing signal of the other driver.

6. A display device comprising:

a display panel, comprising a plurality of data lines and a plurality of gate lines arranged intersecting the plurality of data lines; and a first to wth drivers, wherein w is an integer of 2 or greater, and each of the first to the wth drivers comprises:

a first to kth output channels, outputting, to each of the plurality of data lines of the display panel, a first to kth pixel drive signals corresponding to each of a pixel indicated by a video signal, wherein k is an integer of 2 or greater;

a delay control circuit, sequentially supplying a first to kth output timing signals corresponding to the first to the kth output channels, the first to the kth output timing signals causing the first to the kth pixel drive signals to be respectively output at timings after elapse of different delay times; and an output part, outputting the first to the kth pixel drive signals at an output timing corresponding to a supply timing of the first to the kth output timing signals, wherein the delay control circuit comprises:

a first to sth delay timing signal generation circuits, generating a first to sth delay timing signal groups, each comprising a first to kth delay timing signals corresponding to the first to the kth output channels and bringing about output timings that increase in delay time for each of an output channel from the first output channel to the kth output channel or from the kth output channel to the first output channel, and being mutually different in interval between the output timings brought about by the first to the kth delay timing signals, wherein s is an integer of 2 or greater;

a control signal generation circuit, individually supplying, to each of the first to the sth delay timing signal generation circuits, a start pulse signal indicating a timing of starting sequential generation of the first to the kth delay timing signals; and a delay signal selection circuit, receiving the first to the sth delay timing signal groups generated by the first to the sth delay timing signal generation circuits, selecting, for each of the first to the kth output channels, a delay timing signal with an earliest output timing from among s delay timing signals corresponding to that output channel, and supplying, as the first to the kth output timing signals, k delay timing signals selected for each of the first to the kth output channels to the output part, wherein the control signal generation circuit supplies the start pulse signal to each of the first to the sth delay timing signal generation circuits in order of the first to the sth delay timing signal generation circuits, and performs control on the first to the sth delay timing signal generation circuits in order of the first to the sth delay timing signal groups to lower an increase rate of the delay time according to the first to the kth delay timing signals belonging to that delay timing signal group.

* * * * *